INVENTOR.
HENRY G. HOEHMANN
BY Elmer Galbiati
ATTORNEY

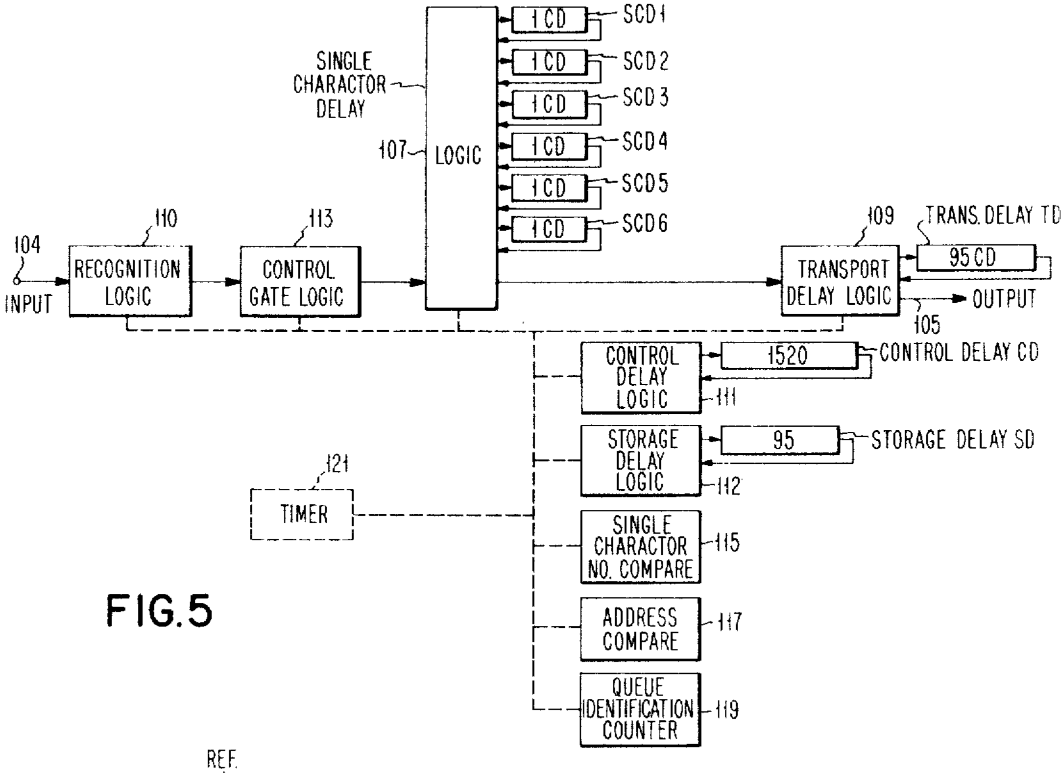
FIG. 5
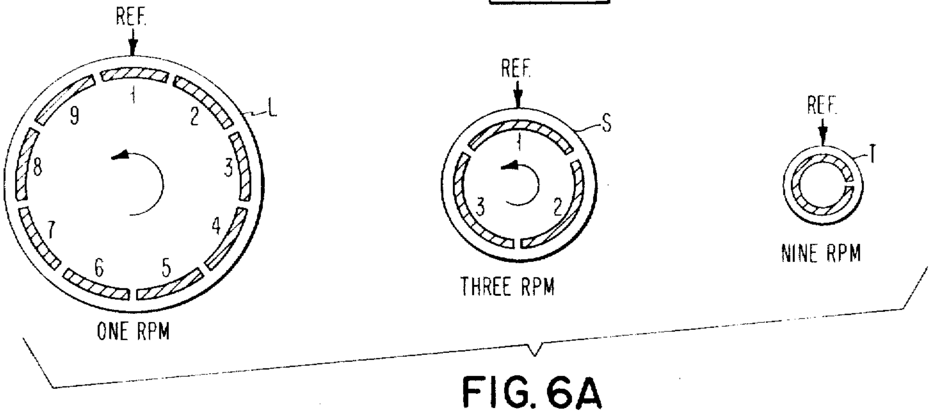
FIG. 6A
FIG. 6B
| ROW | COLUMN | 1 | 2 | 3 | 4 | 5 | 6 | 7 | 8 | 9 | 10 |
|---|---|---|---|---|---|---|---|---|---|---|---|
| a | DISK L | 1 | 2 | 3 | 4 | 5 | 6 | 7 | 8 | 9 | 1 |
| b | DISK S | 1 | 2 | 3 | 1 | 2 | 3 | 1 | 2 | 3 | 1 |
| c | | 1 | 2 | 3 | 4 | 1 | 2 | 3 | 4 | 1 | 2 |
FIG. 6C
| ROW | COLUMN 1 2 3 |
|---|---|
| a | DISK L 1——5——9 |
| b | DISK S 1—(3)—2(3)——(3) |
| c | 1——(4)1——(4)5 |

Jan. 24, 1967 H. G. HOEHMANN 3,300,763

MESSAGE EXCHANGE SYSTEM UTILIZING TIME MULTIPLEXING AND A PLURALITY OF DIFFERENT SIZED REVOLVERS

Filed Aug. 20, 1963 13 Sheets-Sheet 3

| ROW / COLUMN | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| 1. CONTROL DELAY | 1 | 17 | 33 | 49 | 65 | 81 | 97 | 113 | 129 | 145 | 161 | 177 | 193 | 209 | 225 | 1489 | 1505-(1520) | 1 | 17 | 33 | 49 |
| 2. INPUT-OUTPUT STATION | 1 | 2 | 3 | 4 | 5 | 6 | 7 | 8 | 9 | 10 | 11 | 12 | 13 | 14 | 15 | 94 | 95 | 1 | 2 | 3 | 4 |
| 3. TRANSPORT DELAY | 1 | 17 | 33 | 49 | 65 | 81-(95) | 2 | 18 | 34 | 50 | 66 | 82-(95) | 3 | 19 | 35 | 64 | 80-(95) | 1 | 17 | 33 | 49 |
| 4. STORAGE DELAY | 1 | 17 | 33 | 49 | 65 | 81-(95) | 2 | 18 | 34 | 50 | 66 | 82-(95) | 3 | 19 | 35 | 64 | 80-(95) | 1 | 17 | 33 | 49 |
| 5. SCD 1 | 81-(96) | 1 | 17 | 33 | 49 | 65 | 81-(96) | 1 | 17 | 33 | 49 | 65 | 81-(96) | 1 | 17 | 33 | 49 | 65 | 81-(96) | 1 | 17 |
| 6. SCD 2 | 1 | 17 | 33 | 49 | 65 | 81-(96) | 1 | 17 | 33 | 49 | 65 | 81-(96) | 1 | 17 | 33 | 49 | 65 | 81-(96) | 1 | 17 | 33 |
| 7. SCD 3 | 17 | 33 | 49 | 65 | 81-(96) | 1 | 17 | 33 | 49 | 65 | 81-(96) | 1 | 17 | 33 | 49 | 65 | 81-(96) | 1 | 17 | 33 | 49 |
| 8. SCD 4 | 33 | 49 | 65 | 81-(96) | 1 | 17 | 33 | 49 | 65 | 81-(96) | 1 | 17 | 33 | 49 | 65 | 81-(96) | 1 | 17 | 33 | 49 | 65 |
| 9. SCD 5 | 49 | 65 | 81-(96) | 1 | 17 | 33 | 49 | 65 | 81-(96) | 1 | 17 | 33 | 49 | 65 | 81 | 1 | 17 | 33 | 49 | 65 | 81 |
| 10. SCD 6 | 65 | 81-(96) | 1 | 17 | 33 | 49 | 65 | 81-(96) | 1 | 17 | 33 | 49 | 65 | 81-(96) | 1 | 17 | 33 | 49 | 65 | 81-(96) | 1 |

FIG. 7

| ROW / COLUMN | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|
| 1 CONTROL DELAY | 97 | 98 | 99 | 100 | 101 | 102 | 103 | 104 | 105 | 106 | 107 | 108 | 109 | 110 | 111 | 112 | 113 | 114 | 115 | 116 | 117 | 118 | 119 | 120 | 121 | 122 | 123 | 124 | 125 | 126 | 127 | 128 | 129 | 130 | 131 | 132 |
| 1 | | | | | | | | | | | | | | | | X | | | | | | | | | | | | | | | | | | X | | |
| 2 INPUT-OUTPUT STATION | 7 | | | | | | | | | | | | | | | | 8 | | | | | | | | | | | | | | | | 9 | | | |
| 3 TRANSPORT DELAY | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 |
| 3b. | | | | | | | | | | | | | | | | B | | | | | | | | | | | | | | | | | | B | | |
| 4 STORAGE DELAY | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 |
| 5. SCD 1 | 81 | 82 | 83 | 84 | 85 | 86 | 87 | 88 | 89 | 90 | 91 | 92 | 93 | 94 | 95 | (96) | 1 | 2 | 3 | 4 | 5 | 6 | 7 | 8 | 9 | 10 | 11 | 12 | 13 | 14 | 15 | 16 | 17 | 18 | 19 | 20 |
| 6. SCD 2 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
| 6 b. | B | B | B | B | B | B | B | B | B | B | B | B | B | B | B | B | B | B | B | B | B | B | B | B | B | B | B | B | B | B | B | B | B | B | B | B |
| 7. SCD 3 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 |
| 8 SCD 4 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 |
| 9. SCD 5 | 49 | 50 | 51 | 52 | 53 | 57 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | 77 | 78 | 79 | 80 | 81 | 82 | 83 | 84 |
| 10. SCD 6 | 65 | 66 | 67 | 68 | 69 | 70 | 71 | 72 | 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 | (96) | 1 | 2 | 3 | 4 |

FIG. 8

Jan. 24, 1967 H. G. HOEHMANN 3,300,763

MESSAGE EXCHANGE SYSTEM UTILIZING TIME MULTIPLEXING AND A PLURALITY OF DIFFERENT SIZED REVOLVERS

Filed Aug. 20, 1963 13 Sheets-Sheet 8

| INPUT-OUTPUT STATION | NUMBER OF ASSOCIATED CHARACTER POSITION ON TD AND SD | SEVEN BIT APPEARANCE OF ADDRESS | | | | | | | THREE ADDRESS CHARACTER APPEARANCE OF ADDRESS | | |
|---|---|---|---|---|---|---|---|---|---|---|---|
| L1 | 1 | 0 | 0 | 0 | 0 | 0 | 0 | 0 | 9 | 9 | 9 |
| L2 | 17 | 0 | 0 | 1 | 0 | 0 | 0 | 0 | 9 | 6 | 9 |
| L3 | 33 | 0 | 1 | 0 | 0 | 0 | 0 | 0 | 9 | 7 | 9 |
| L4 | 49 | 0 | 1 | 1 | 0 | 0 | 0 | 0 | 9 | 2 | 9 |
| L5 | 65 | 1 | 0 | 0 | 0 | 0 | 0 | 0 | 0 | 9 | 9 |
| L6 | 81 | 1 | 0 | 1 | 0 | 0 | 0 | 0 | 0 | 6 | 9 |
| L7 | 2 | 0 | 0 | 0 | 0 | 0 | 0 | 1 | 9 | 9 | 0 |
| L8 | 18 | 0 | 0 | 1 | 0 | 0 | 0 | 1 | 9 | 6 | 0 |
| L9 | 34 | 0 | 1 | 0 | 0 | 0 | 0 | 1 | 9 | 7 | 0 |
| L10 | 50 | 0 | 1 | 1 | 0 | 0 | 0 | 1 | 9 | 2 | 0 |
| L11 | 66 | 1 | 0 | 0 | 0 | 0 | 0 | 1 | 0 | 9 | 0 |
| L12 | 82 | 1 | 0 | 1 | 0 | 0 | 0 | 1 | 0 | 6 | 0 |
| L13 | 3 | 0 | 0 | 0 | 0 | 0 | 1 | 0 | 9 | 9 | 6 |
| L14 | 19 | 0 | 0 | 1 | 0 | 0 | 1 | 0 | 9 | 6 | 6 |
| ⋮ | ⋮ | ⋮ | ⋮ | ⋮ | ⋮ | ⋮ | ⋮ | ⋮ | ⋮ | ⋮ | ⋮ |
| L94 | 64 | 0 | 1 | 1 | 1 | 1 | 1 | 1 | 9 | 3 | 3 |
| L95 | 80 | 0 | 0 | 0 | 1 | 1 | 1 | 1 | 9 | 0 | 3 |
| L1 | 1 | 0 | 0 | 0 | 0 | 0 | 0 | 0 | 9 | 9 | 9 |
FIG. 11C
| ALLOWABLE ADDRESS CHARACTERS | BINARY BITS REPRESENTED | | | SIX BIT CODE USED FOR TRANSMISSION | | | | | |
|---|---|---|---|---|---|---|---|---|---|
| 0 | 0 | 0 | 1 | 1 | 1 | 0 | 0 | 0 | 1 |
| 2 | 1 | 1 | 0 | 1 | 1 | 0 | 1 | 1 | 0 |
| 3 | 1 | 1 | 1 | 1 | 1 | 1 | 1 | 1 | 0 |
| 5 | 0 | 1 | 1 | 1 | 1 | 0 | 0 | 1 | 1 |
| 6 | 0 | 1 | 0 | 1 | 1 | 0 | 0 | 1 | 0 |
| 7 | 1 | 0 | 0 | 1 | 1 | 1 | 0 | 1 | 1 |
| 8 | 1 | 0 | 1 | 1 | 1 | 1 | 0 | 1 | 0 |
| 9 | 0 | 0 | 0 | 1 | 1 | 0 | 0 | 0 | 0 |
FIG. 11D
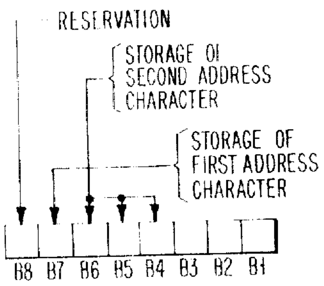
FIG. 11E
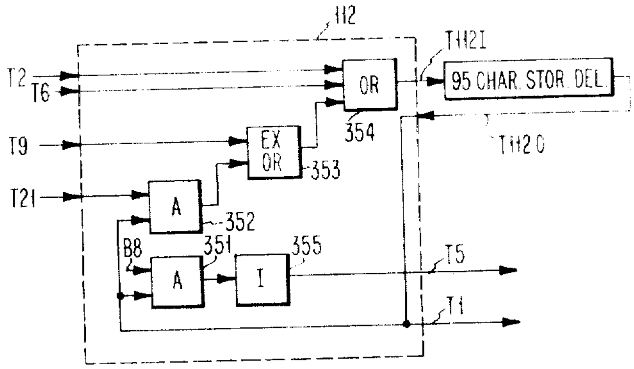
FIG. 11F United States Patent Office 3,300,763

Patented Jan. 24, 1967

3,300,763

MESSAGE EXCHANGE SYSTEM UTILIZING TIME MULTIPLEXING AND A PLURALITY OF DIFFERENT SIZED REVOLVERS

Henry G. Hoehmann, Los Gatos, Calif., assignor to International Business Machines Corporation, New York, N.Y., a corporation of New York Filed Aug. 20, 1963, Ser. No. 303,340
9 Claims. (Cl. 340—172.5)

This invention relates to communications systems. More particularly, this invention relates to communications systems which have a large number of independent terminal stations for sending and receiving messages.

In general, terminal stations (i.e., input-output devices) operate at relatively low speed. That is, the speed of input-output devices is low compared to the speed of modern data processing equipment. For example, the time between characters generated by a manually operated typewriter keyboard is in the order of magnitude of tenths of a second. In contrast, the time required to accomplish a switching operation in a modern electronic data processing system is in the order of magnitude of millionths of a second. Hence, if one or more conventional input-output devices are connected to a modern high speed data processing system, the data processing system can perform a large number of switching operations between each signal from the input-output devices.

The present invention provides a special purpose data processing system which can be used as a low cost exchange for a communication system which has a large number of input-output devices. The essence of the invention lies in the organization system whereby a relatively inexpensive data processing system can efficiently accomplish all the needed storage and switching functions for a large number of input-output devices.

The system of the present invention includes a queuing buffer in each input-output channel and an exchange which is common to all the channels. The queuing buffer in each channel receives messages asynchronously from the associated input-output station, it establishes and stores an input queue (i.e., a list of messages) and, it feeds message characters on a synchronous basis to the exchange. The queuing buffer in each channel also receives message characters on a synchronous basis from the exchange, it establishes an output queue and, it feeds the message characters to the associated input-output station.

The exchange operates synchronously based upon a machine cycle which allocates a plurality of character times to each channel. During one particular character time during each machine cycle, a character can be transferred from the queuing buffer associated with each channel to the exchange and during the same character time, a character can be transferred from the exchange to the queuing buffer associated with the particular channel.

The exchange includes a plurality of repeaters (i.e., circulating storage elements) which repeat information stored therein at preestablished intervals. These repeaters store both control information and message characters. By correctly matching the length of the delays introduced by the various repeaters and their synchronization, the correct control information and the correct message characters are available at optimum times, thereby requiring a minimum amount of control circuitry.

The object of the present invention is to provide an improved message exchange system.

A further object of the present invention is to provide a low cost message exchange system.

Yet another object of the present invention is to provide a system for directing a message from a transmitting station to one or more receiving stations.

Still another object of the present invention is to provide efficient means for transferring messages from a sending queue to one or more receiving queues.

Yet another object of the present invention is to provide a low cost message exchange system for a plurality of slow input-output stations by using a relatively high speed data processing system.

Yet another object of the present invention is to provide a high speed message exchange system having few components for handling the messages being transmitted between a relatively large number of terminals.

Yet another object of the present invention is to provide a message exchange system having relatively few components which can simultaneously handle the exchange of messages between a relatively large number of terminals.

Yet another object of the present invention is to provide a high speed message exchange system having few components which can simultaneously direct a plurality of messages between a plurality of terminals.

A still further object of the present invention is to provide a message exchange which responds to address characters at the beginning of each message, establishing a route therein so that message characters which follow are directed to the appropriate output stations.

The foregoing and other objects, features and advantages of the invention will be apparent from the following more particular description of a preferred embodiment of the invention, as illustrated in the accompanying drawings.

FIGURE 5 is a schematic diagram showing the major components in the exchange shown in FIGURE 1.

FIGURE 6A shows three rotating disks having characters recorded thereon.

FIGURE 6B is a chart showing the synchronization between the disks shown in FIGURE 6A.

FIGURE 6C is a simplified form of the chart shown in FIGURE 6B.

FIGURE 7 is a chart which shows the synchronization between various components in the exchange shown in FIGURE 5.

FIGURE 8 is an expanded portion of the chart shown in FIGURE 7.

Figures 10, 10A:
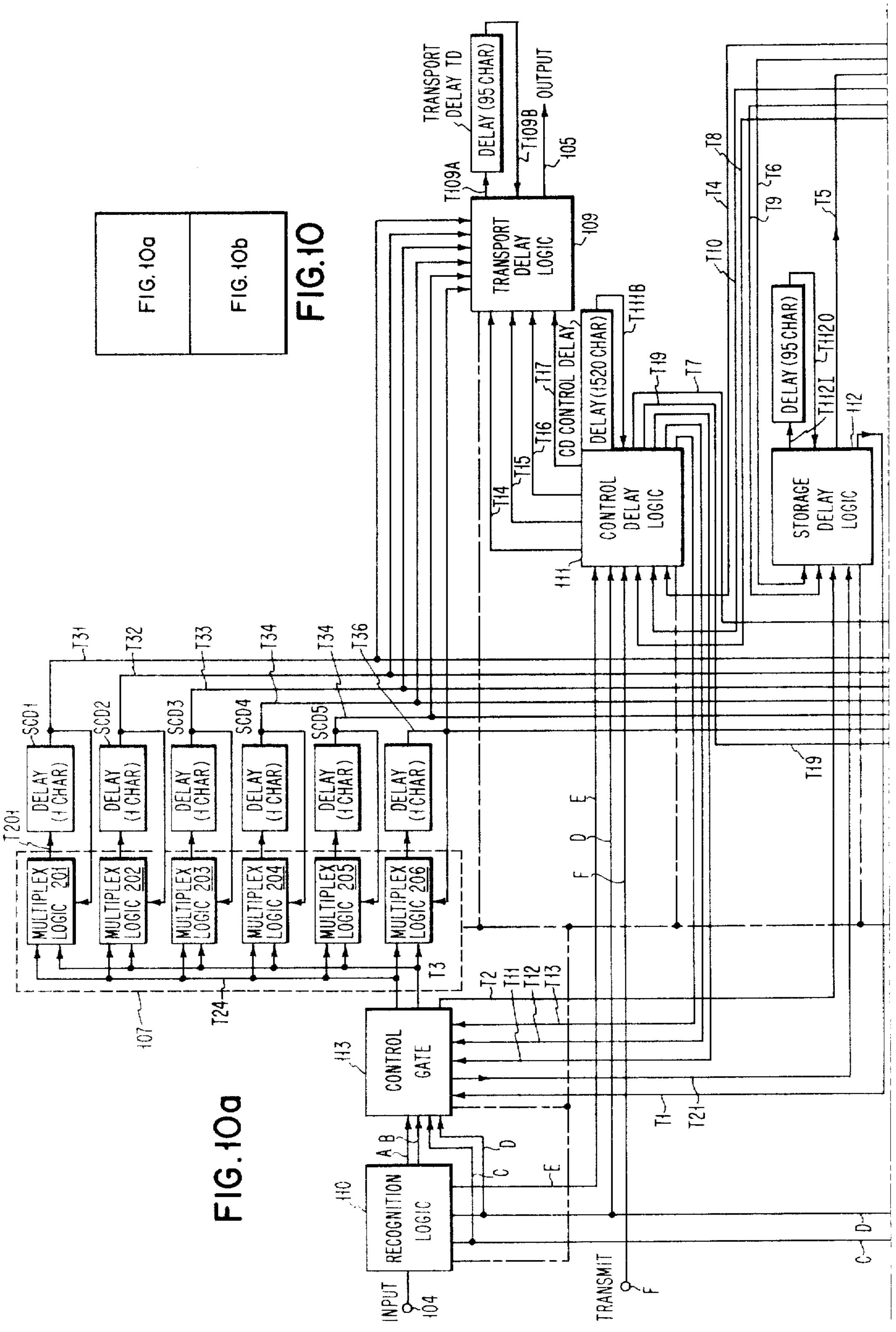
Figure 10B:
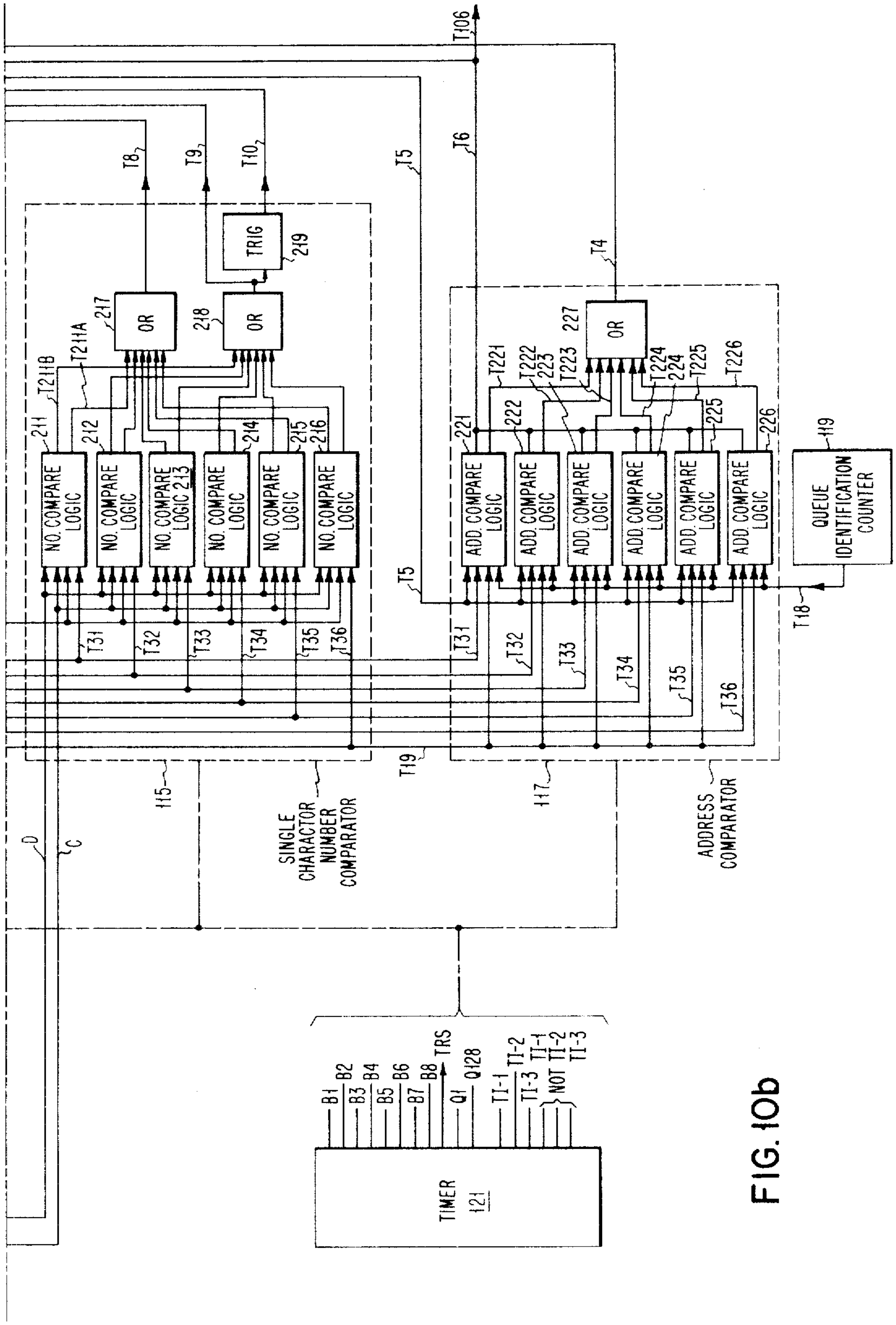

FIGURES 10*a* and 10*b* (which fit together as shown in FIGURE 10) are a schematic diagram showing the details of control delay logic.

Figures 11A, 11B:
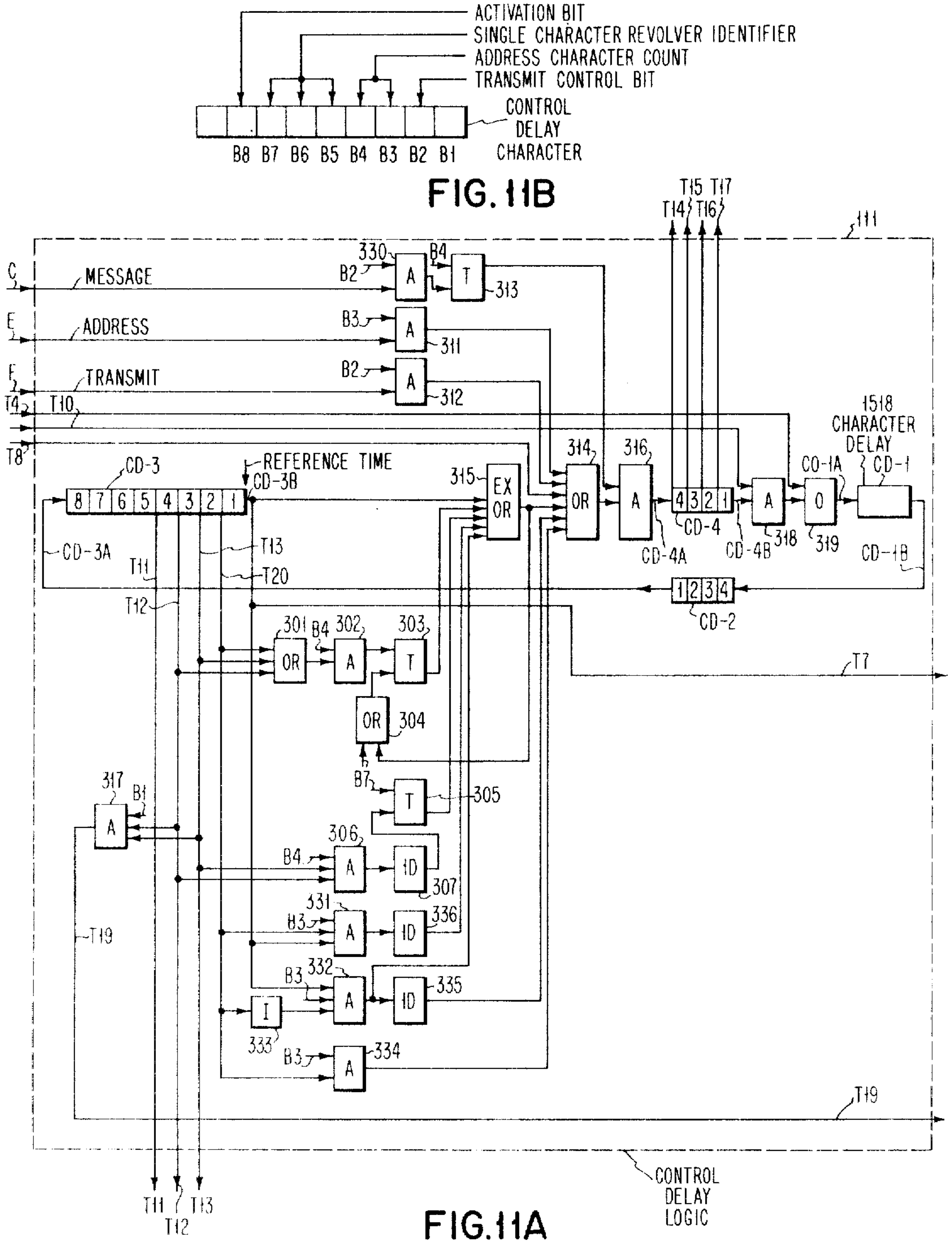

FIGURE 11A is a schematic block diagram of the control delay logic.

FIGURE 11B is a chart showing the use of the various bits in each character stored in the control delay element.

FIGURE 11C is a chart showing the various forms of addresses associated with each input-output station.

FIGURE 11D is a chart showing the conversion between different forms of address characters.

FIGURE 11E is a chart showing how the various bits in each character stored in the storage delay element are used.

FIGURE 11F is a schematic diagram showing the details of the storage delay logic.

Figure 12:
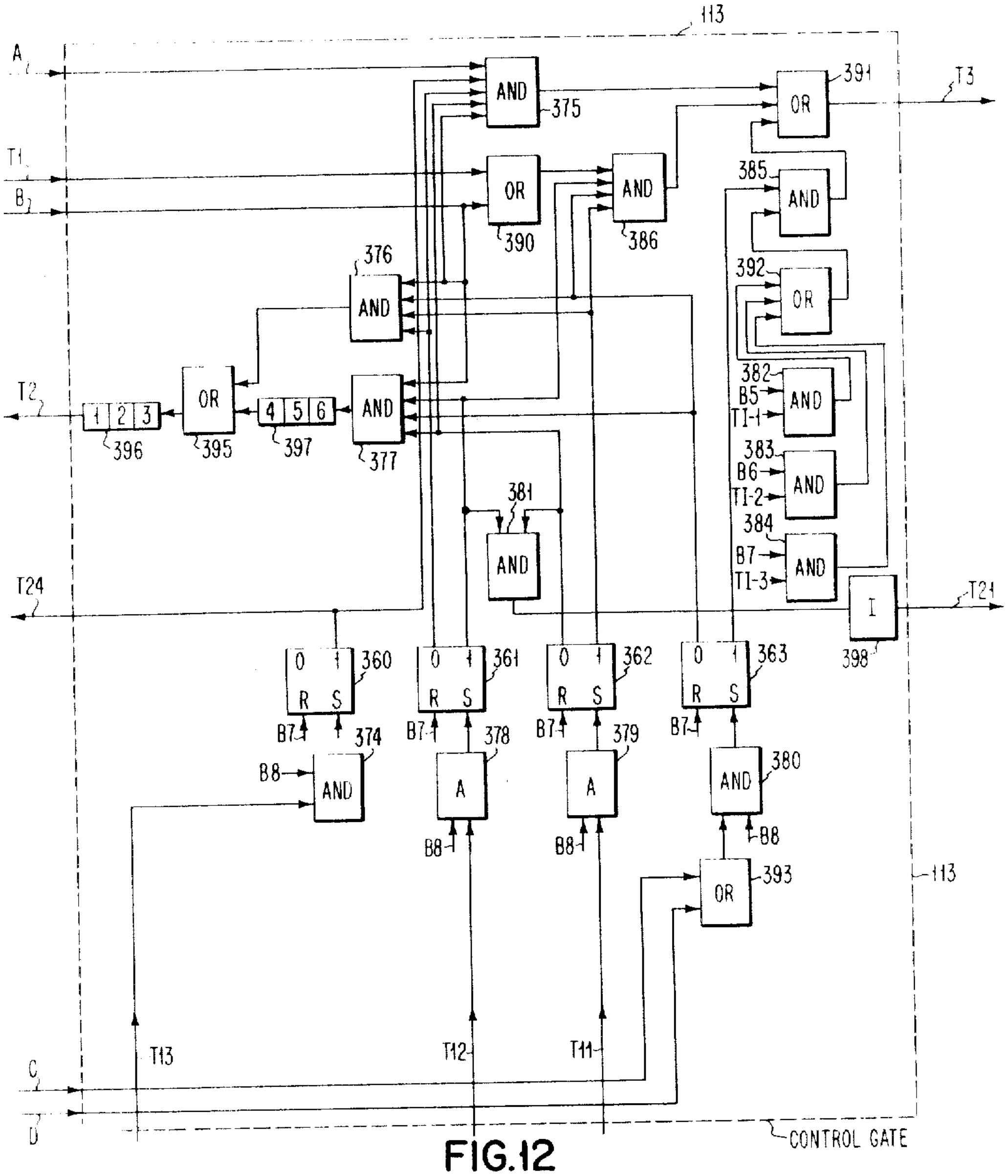

FIGURE 12 is a schematic circuit diagram showing the details of the control gate logic.

Figure 13:
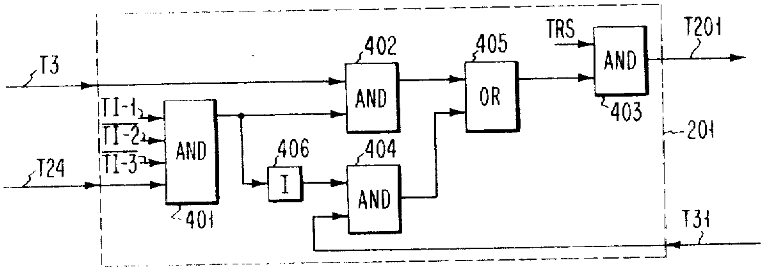

FIGURE 13 is a schematic circuit diagram showing the details of the multiplexing logic associated with the first single character delay element.

Figure 14:
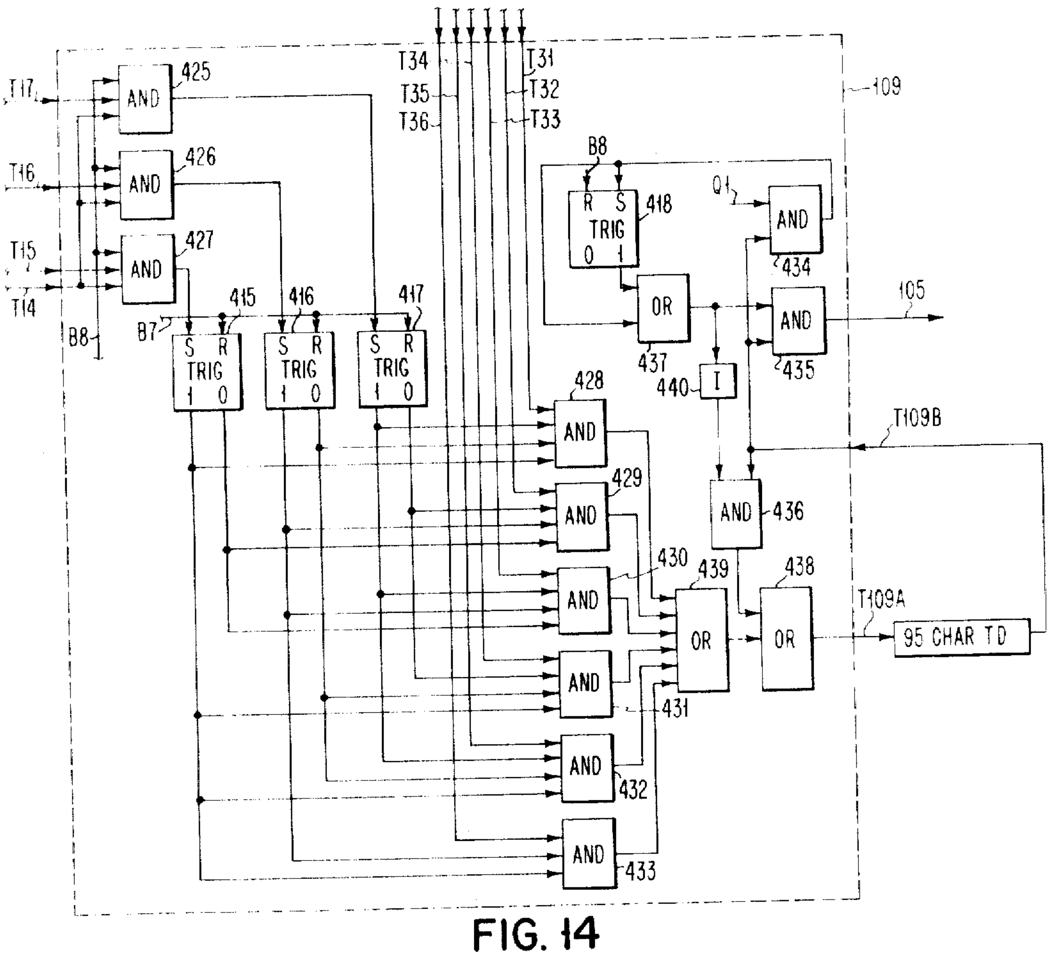

FIGURE 14 is a circuit diagram showing the details of the transport delay logic.

Figure 15:
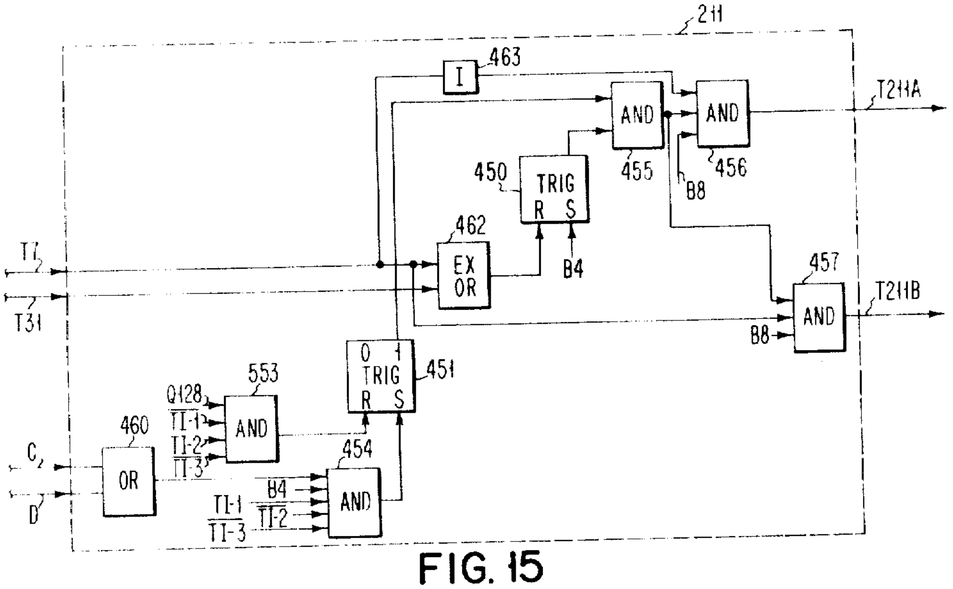

FIGURE 15 is a schematic circuit diagram showing the details of the number comparison logic.

Figure 16:
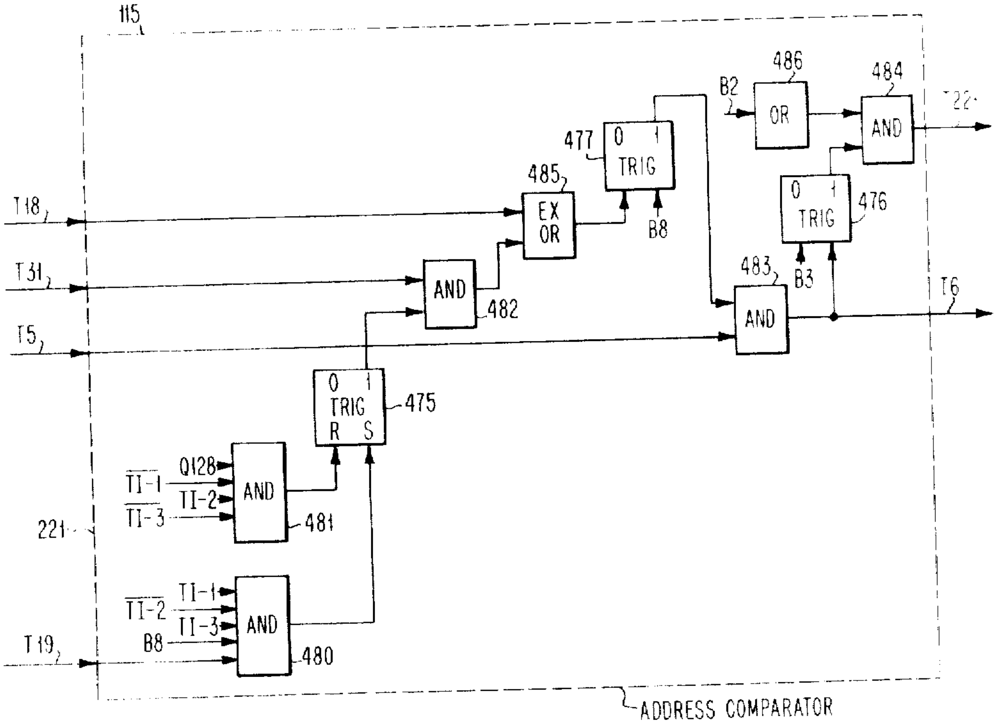

FIGURE 16 is a schematic circuit diagram showing the details of the address comparison logic.

Figure 17:
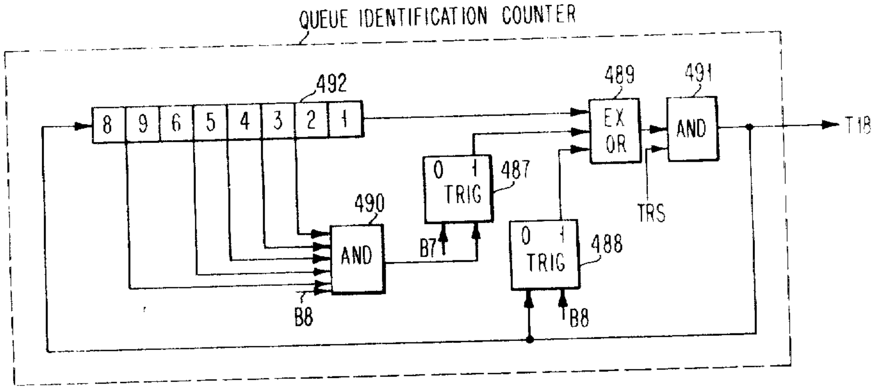

FIGURE 17 is a schematic circuit diagram showing the details of the queue identification counter.

Figure 18A:
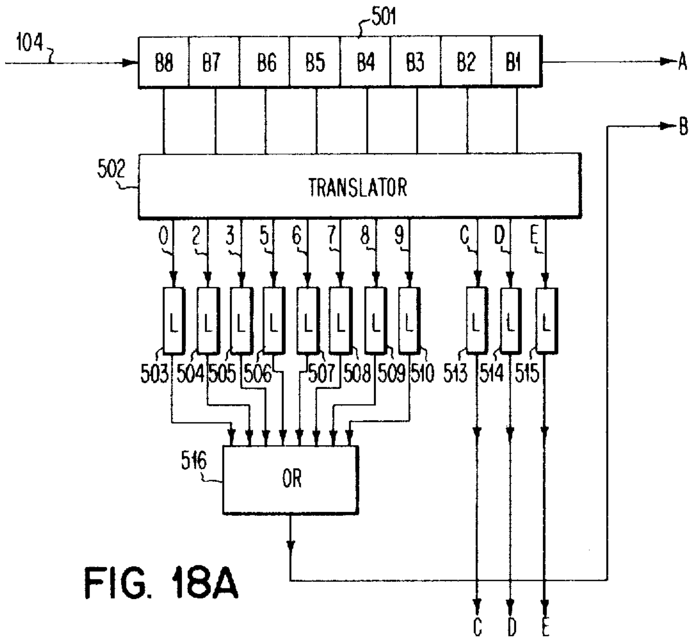
Figure 18C:
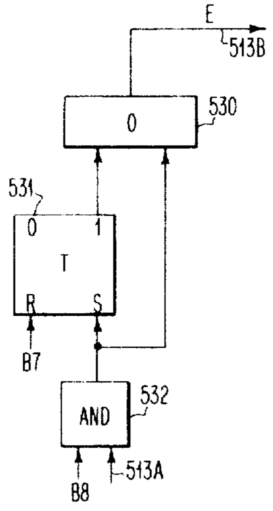
Figure 18B:
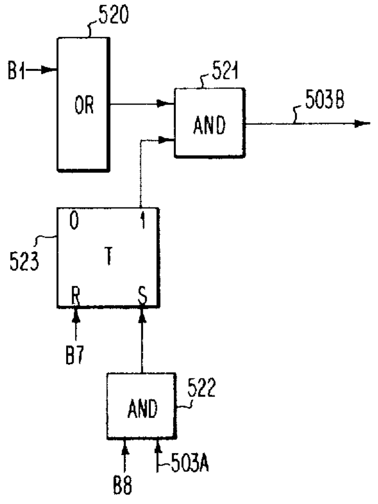

FIGURES 18A, 18B and 18C show the details of the message recognition logic.

TABLE OF CONTENTS

| | Column |
|---|---|
| I. General Description: | |
| A. Message Transfer Mode | 8 |
| B. Address Setup Mode | 9 |
| C. Address Erase Mode | 11 |
| II. Interconnections Between Major Components in Exchange 102: | |
| A. Recognition Logic 110 | 12 |
| B. Control Gate 113 | 12 |
| C. Single Character Delay Logic 107 | 13 |
| D. Transport Delay Logic 109 | 13 |
| E. Single Character Number Comparator 115 | 13 |
| F. Queue Identification Counter 119 | 14 |
| G. Address Comparator 117 | 15 |
| III. Detailed Description of Circuitry: | |
| A. Timer | 15 |
| B. Address Numbering Scheme | 16 |
| C. Control Delay Logic 111 and Control Delay CD | 17 |
| D. Storage Delay SD | 22 |
| E. Control Gate Logic 113 | 23 |
| F. Multiplexing Logic 107 | 24 |
| G. Transport Delay Logic 109 | 24 |
| H. Single Character Number Comparator 115 | 25 |
| I. Address Comparator 117 | 26 |
| J. Queue Identification Counter 119 | 27 |
| K. Message Recognition Logic | 28 |
| L. Queuing Memory | 29 |
| IV. General Summary: | |
| A. Address Setup Mode | 31 |
| B. Message Transfer Mode | 33 |
| C. Address Erase Mode | 33 |

*General description*

Figure 1:
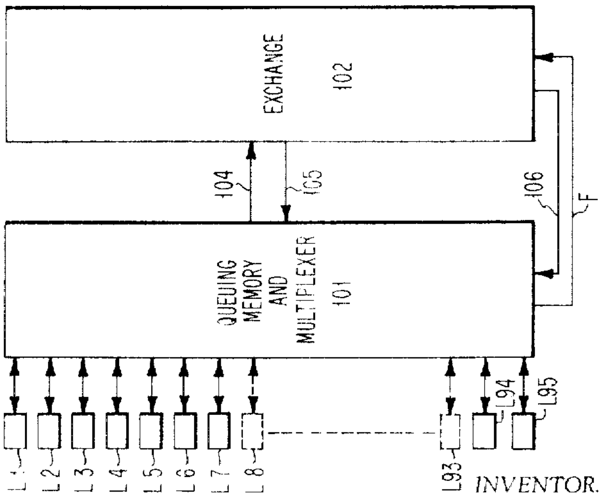
FIGURE 1 is an overall schematic diagram of the system.

An overall block diagram of a preferred embodiment of the invention is shown in FIGURE 1. It includes ninety-five input-output stations designated L1 to L95, a queuing memory 101 and an exchange 102. Each of the stations L1 to L95 can transmit and receive messages. Each message include (*a*) control characters (*b*) address characters and (*c*) message characters in the format shown in FIGURE 2. The first character in each message is a control character ACF. The control character ACF is followed by a number of address characters which designate the particular station or stations to which the message is directed. The address characters are followed by a control character MCF which designates that there are no further address characters in the message. The control character MCF is followed by the message characters which form the message proper. The last message character is followed by a control character EM which indicates that there are no further characters in the message.

Queuing memory 101 temporarily stores messages transmitted by the various stations and it makes the characters in each message available to the exchange 102 on line 104 on a synchronous time-shared basis. In general, when memory 101 makes a character available to exchange 102 it is not destroyed, but instead memory 101 recirculates the character so that after the last character of a message is made available to exchange 102, the first character in the message is again made available to the exchange. However, when memory 101 receives a signal on control line 106 the last character transmitted and the two preceding characters of the same message are destroyed (i.e., not recirculated). Memory 101 thus provides a recirculating queue or list of characters for each channel. On a signal from exchange 102 via line 106 three characters previously supplied to exchange 102 are deleted from the queue, that is, the queue associated with a particular input-output station is shortened by three characters.

Characters from the various input stations are sent to the exchange 102 on a time multiplex basis over line 104 and the characters directed to the various output stations are returned to memory 101 on a time multiplex basis over line 105. The time a character appears on line 104 indicates the station where the character originated and the time a character appears on line 105, indicates the station to which the character is directed. Exchange 102 temporarily stores the various characters for amounts of time controlled by the address at the beginning of the associated message, thereby directing the characters to the stations designated by these address if these stations are free to receive the characters.

For example, at one particular time a message from line 1 which is stored at queuing memory 101 may be in the process of being transmitted through exchange 102 to lines 4, 94 and 95. While this message is being transmitted to lines 4, 94 and 95 queuing memory 101 may receive a message from line 5 which is directed to lines 1 and 94. Since line 94 is busy receiving the message from line 1, the second message when it is sent through exchange 102 is only directed to line 1 and the message is recirculated in memory 101. Thereafter when line 94 is free the message is again sent through exchange 102 to line 94.

Figure 3:
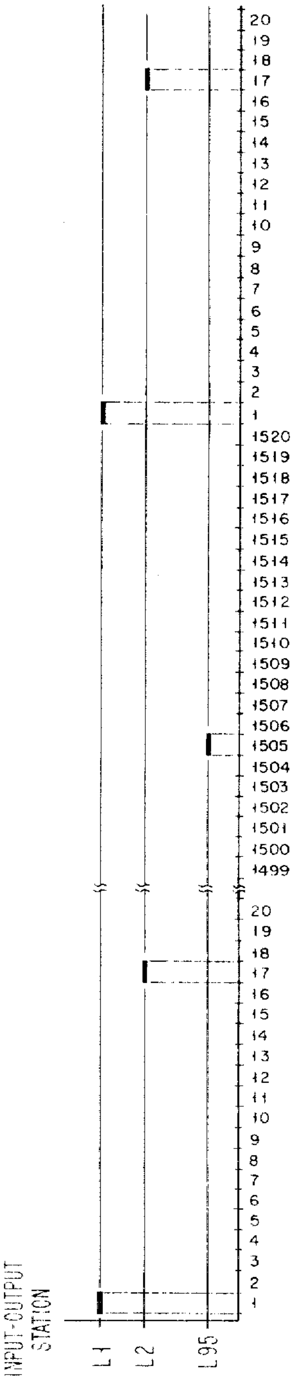
FIGURE 3 is a timing diagram showing the times at which messages are transferred between the memory and the exchange shown in FIGURE 1.

The time multiplex basis on which messages are transferred from queuing memory 101 to exchange 102 and back to queuing memory 101 is shown in FIGURE 3. The memory 101 and the exchange 102 operate based upon a cycle which has one thousand five hundred and twenty (1520) character times. One character can be transmitted from queuing memory 101 to exchange 102 and vice versa every sixteen character times. This is shown in FIGURE 3. During character time one a message character which originated at station L1 can be transmitted to exchange 102 and a character directed to station L1 can be transmitted from exchange 102 to memory 101, during character time seventeen a message character which originated at station L2 can be transmitted to exchange 102 and a character directed to station L2 can be transmitted from exchange 102 to memory 101, etc. until at character time one thousand five hundred and five (1505) a character which originated at station L95 can be transmitted to exchange 102. A second character which originated at station L1 can be transmitted to exchange 102 in the first character time of the next cycle, etc. The first character time of the next cycle follows character time one thousand five hundred and twenty (1520).

Control signals can only be transmitted on lines 106 and F during the ninety-five character times which are associated with input-output stations (shown in FIGURE 3). A signal on line 106 during a particular character time indicates that the recirculating message in memory 101 (i.e., the queue), which is associated with the character time during which the signal is sent should be shortened by three characters. A signal on line F during a particular character time indicates that the input-output station associated with the particular character time has a message in memory 101 which is ready for transmission to exchange 102. It should be particularly noted that during fifteen out of each sixteen character times no characters are being transmitted from the queuing memory 101 to exchange 102 or from exchange 102 to queuing memory 101. As will be seen in detail later, these character times are used for internal manipulations within exchange 102.

Figure 4:
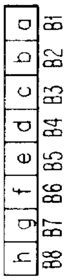
FIGURE 4 shows the format of each character in the system.

Each character time is divided into eight bit times as shown in FIGURE 4. In general, the first seven bit times in each character time are used to transmit either a control character, an address character or a message character and the eighth bit time is used for control purposes. The bit times are designated B1 to B8.

The time that a character appears on line 104 indicates which input station transmitted the character and the time that a particular character appears on line 105 designates the particular station that will receive the particular character. Hence, the general function of exchange 102 is to delay characters by appropriate amounts. Furthermore, in order to send a particular character to a plurality of stations, the character must be repeatedly transmitted over line 105 at the correct times. In order to perform the above functions, exchange 102 includes nine synchronized delay elements of various lengths.

FIGURE 5 is an overall schematic diagram of exchange 102 showing the major elements therein. There are six single character delay elements designated SCD1 to SCD6, a transport delay element designated TD, a control delay element designated CD and a storage delay designated SD. Single character delay elements SCD1 to SCD6 are each one character long. That is, if the bits of a particular character are sequentially introduced into the input of any one of these delay elements at a particular time they sequentially appear at the output thereof one character time later. Transport delay element TD is ninety-five (95) characters long. Control delay element CD is one thousand five hundred and twenty (1520) characters long, and storage delay SD is ninety-five (95) characters long. Each of the ninety-five positions on storage delay SD and each of the one thousand five hundred and twenty positions on control delay CD is uniquely associated with a particular one of the 95 input-output stations L1 to L95. The association between the positions on storage delay SD and on control delay CD and the input-output stations will be explained later.

Each of the nine delay elements has logic associated therewith which controls the signals applied thereto and received therefrom. The logical circuitry which controls the delay elements SCD1 to SCD6 is designated 107 and the logic associated with transport delay TD, control delay CD, and storage delay SD is respectively designated 109, 111, and 112. The other major components in the system are recognition logic 110, control gate logic 113, single character delay number comparator 115, address comparator 117, queue identification counter 119 and timer 121.

Characters which are sent from memory 101 to exchange 102 first go through recognition logic 110 (see FIGURE 5). Recognition logic 110 detects the control characters and in accordance therewith sets the circuitry in exchange 102 in the condition to handle the following characters.

Figure 2:
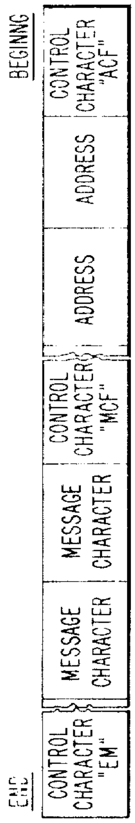
FIGURE 2 shows the format of messages transferred through the system.

The operation of the exchange 102 is in general divided into three separate and distinct modes which are respectively termed "the address setup mode," "the message mode" and "the address erase mode." The system is in the address setup mode while it is processing that portion of a message between control characters ACF and MCF (see FIGURE 2). During the address setup mode, control bits are set at appropriate places in control delay CD and storage delay SD so that when the system subsequently goes into message mode each message character will be made to appear on output line 105 at the appropriate times. Stated differently, during the address setup mode a route is established or enabled for the characters which are subsequently transmitted during a message mode. During the address erase mode the previously established route is disenabled or obliterated.

The synchronization which exists between the characters stored in the various delay elements is shown in FIGURE 7. FIGURES 6A, 6B and 6C will be used to explain FIGURE 7. FIGURE 6A shows a large revolving disk L which has nine characters designated 1 to 9 recorded around its periphery, a medium-sized disk S which has three characters designated 1 to 3 recorded around its periphery and a very small disk T which has one character recorded on its periphery. Each of the characters is equal in length; however, for convenience of illustration the characters on the layer disks are shown as being compressed. Disk L revolves at a speed of one revolution per minute, disk S revolves at a speed of three revolutions per minute and disk T revolves at a speed of nine revolutions per minute. A stationary reference arrow is associated with each disk. This reference arrow could be a combined read-write head.

FIGURE 6B describes the synchronization of the disks shown in FIGURE 6A. For ease in reference the columns in FIGURES 6B and 6C are numbered and each row is given a different letter designation. FIGURE 6B shows which characters on disks L and S are passing the reference arrows at any particular time. For disk T the same character is always passing a reference arrow since there is only one character on the disk. Row *c* in FIGURE 6B is used to show the length of time (i.e., the number of revolutions) that a particular character remains recorded on disk T. For example, column 5 in FIGURE 6B shows that when character position five on disk L is passing the associated reference arrow, character position two on disk S is passing the associated reference arrow. Row *c*, column 5, indicates that this is the first time that the character then recorded on disk T has passed the associated reference arrow.

The horizontal axis in FIGURE 6B can be considered as designating the various character times through which the system passes and the numbers in the various columns may be considered as designating the state of each disk (i.e., the orientation of each disk) at that particular character time.

FIGURE 6C shows an abbreviated form of the chart shown in FIGURE 6B. In the chart of FIGURE 6C certain of the numerals are omitted and only the numerals of particular interest are shown. Where two numerals are connected by a dashed line, it indicates that the intervening numerals have been omitted. The fact that a disk has started a new cycle is indicated by an encircled number such as in number "3" in row *b* between columns 1 and 2. The point at which new cycles start is always shown. The format of FIGURE 7 is the same as that of FIGURE 6C.

Each of the delay elements shown in FIGURE 5 can be used as a revolving storage element. A character which is introduced into the input of a delay element appears at the output thereof a certain number of character times later and as each character appears at the output it can be recirculated to the input by the associated logic. At any particular time only one character position is available to the associated logic. This is equivalent to the fact that at any one particular time only one character position is adjacent to each reference arrow in FIGURE 6A. (n.b. the above is a generalization that is subject to certain exceptions which are pointed out in detail later.) The synchronization which exists between the various delay elements shown in FIGURE 5 is shown in FIGURE 7.

Similar to FIGURE 6B, in FIGURE 7 each different column represents a different character time in the machine cycle. Since both the machine cycle and the control delay CD have one thousand five hundred and twenty (1520) character times, the particular character position of the control delay CD being read at any particular time (shown in row 1 of FIGURE 7) also gives the point in the machine cycle represented by the particular column. For ease in illustration the character times between positions two hundred and twenty-five (225) and one thousand four hundred and eighty-nine (1489) which lies between columns 15 and 16 have been omitted.

During each machine cycle exchange 102 can receive one character and transmit one character to each of the ninety-five input-output stations. Those character times during which characters are transmitted between memory 101 and exchange 102 (see FIGURE 3) are hereinafter designated line times. The particular input-output station assoicated with each line time is shown in row 2 of FIGURE 7. Rows 3 and 4 of FIGURE 7 show how the 95 positions on transport delay TD and storage delay SD are synchronized with the one thousand five hundred and twenty (1520) positions on control delay CD and with the signals from the various input-output stations. Signals from and to station L1 are received and transmitted during the first character time of each cycle (see FIGURE 2). This is during the first character time of control delay CD and during the first character time of transport delay TD and storage delay SD (see column 1, FIGURE 7). Ninety-six character times later input-output station 7 is being serviced, control delay CD is at position ninety-seven and transport revolver CD and storage revolver SD are at position two (see column 7 of FIGURE 7). Ninety-six character times later input-output station 13 is being serviced, control delay CD is at position one hundred and ninety-three (193) and transport delay TD and storage delay SD are at position three (see column 13). The transport delay TD and storage delay SD go through sixteen cycles during each machine cycle, i.e., during each cycle of control delay CD. During the first cycle of the transport delay TD and storage delay SD a line time occurs during the first character time of transport delay TD and storage delay SD and no line times occur during character times two to sixteen inclusive of transport delay TD and storage delay SD. During the second cycle of transport delay TD and storage delay SD line time 7 occurs during character time two of transport delay TD and no line times occur during character times three to seventeen of transport delay TD and storage delay SD (see columns 6 and 7). During the third cycle of transport delay TD a line time occurs during the third character time of transport revolver TD and storage delay SD (see column 13, etc.). Each character time of transport revolver TD and of storage delay SD is uniquely associated with one particular line time and this character position in transport delay TD and storage delay SD is only available during that line time. For example, character position one on transport revolver TD is associated with line time 1, character position two on transport revolver TD is associated with line time 7, character position three on transport revolver TD is associated with line time 13, etc. Likewise, each character position on storage delay SD is associated with one particular line time.

Rows 5, 6, 7, 8, 9 and 10 in FIGURE 7 relate to single character delay elements SCD1 to SCD6. Since each single character delay element SCD1 to SCD6 only stores one character, the character stored therein is available during each character time. For reasons which will be explained in detail later, when a particular character is stored in a particular one of the single character delay elements SCD1 to SCD6, it is allowed to remain therein for ninety-six (96) character times. Thus, each character stored in a single character delay element is available for ninety-six character times. The points in the machine cycle during which the characters in the single character delay elements SCD1 to SCD6 are changed is shown in rows 5 to 10 of FIGURE 7. A new character is placed in a single character delay element during each character time which is indicated by a 1 in the associated column of FIGURE 7. For example, column 2 shows that a new character is placed in single character delay element SCD1 during character time seventeen, column 8 shows that a new character is placed in single character delay element SCD1 during character time one hundred and thirteen (113), etc. It should be particularly noted that during the next machine cycle (beginning in column 18) a new character is not placed in single character delay element SCD1 during character time seventeen. Instead, a new character is placed in single character delay element SCD1 during character time thirty-three (33). During the first machine cycle single character delay element SCD2 is beginning a new cycle at line time one; however, during the next machine cycle single character delay element SCD2 is beginning a cycle at line time two. If the chart were continued, it would be noted that during the third machine cycle single character delay element SCD4 would be beginning a new cycle at line time one.

Likewise, the line time two coincides with the beginning of a cycle in single character delay element SCD1, whereas during the second machine cycle line time two (column 19) coincides with the beginning of a new cycle of single character delay element SCD2.

The manner in which the system operates during "message mode," "address setup mode" and "address erase mode" will now be explained. Thereafter the details of the various operations will be explained. The system can be in address setup relative to one input-output station, it may be in message mode relative to a second input-output station, it may be in address setup mode relative to a third input-output station and in address setup mode relative to a fourth input-output station, etc. at the same time. The system is designed such that the operation taking place with respect to one line cannot interfere with the operations taking place with respect to the other lines.

*Message transfer mode*

The manner that message characters are transferred from input 104 to output 105 will now be explained. Each message character is received on input 104 at a particular time. It is stored in one of the single character delay elements SCD1 to SCD6 and it remains in the particular single character delay element for ninety-six (96) character times. Information stored on control delay CD causes the character to be transmitted from the single character delay element to the transport delay element TD at various times so that it will eventually reach output line 105 at the appropriate times.

Each character position in control delay CD can store information which will initiate the transfer of information from a particular single character delay element to the position then available on the transport delay element TD. The information stored on the control delay element CD is the number of a particular single character delay element. For example, if in position one hundred and seventy-seven (177 of control delay CD (see column 12 of FIGURE 7) a number indicating single character delay element SCD4 is stored, then during character time one hundred and seventy-seven (177) the character stored in single character delay element SCD4 is transferred to character position eighty-two (82) on transport delay element TD. Column 12 in FIGURE 7 shows that character position eighty-two (82) on transport delay TD is the character position available at character time one hundred and seventy-seven (177).

The path which characters follow is from input 104 to one of the single character delay elements to transport delay TD to output 105. The particular single character delay element wherein each message character is stored is the particular single character delay element which is beginning a cycle during the character time that message characters are received. For example, column 2 in FIGURE 7 shows that line time two occurs at character time seventeen (17), that is, column 2 shows that during character time seventeen (17) a message character can be received from line two. Column 2 further shows that during character time seventeen (17) single character delay element SCD1 is beginning a new cycle. Message characters from a particular input station do not always use the same single character delay element. For example, column 19 in FIGURE 7 shows that during the next machine cycle the message character received from input-output station 2 is placed in single character delay element SCD2. In general, the message character received from a particular input-output station sequentially uses the six single character delay elements SCD1 to SCD6. That is, if the first character from a particular input station first uses single character delay SCD1, the next character from this station will use single character delay SCD2, the next character will use single character delay SCD3, etc. After single character delay SCD6 is used, the next character again uses single character delay SCD1.

An example will now be given of how exchange 102 transfers a message character from input-output station L7 to input-output stations L2 and L15.

The message character from station L7 is received by exchange 102 (FIGURE 1) on line 104 at character time ninety-seven (97) (see column 7 of FIGURE 7). Exchange 102 must transmit the character on line 105 at character time seventeen (17) for input-output station L2 (see column 2 of FIGURE 7) and at character time 225 for input-output station L15 (see column 15 of FIGURE 7). FIGURE 8 shows the details of each character time between character time ninety-seven (97) and character time one hundred and thirty-two (132), that is, FIGURE 8 shows in detail that portion of FIGURE 7 which lies between columns 7 and 9.

During a previous address setup mode, information was recorded on control delay CD indicating that the next message character received during line time seven was to be transmitted on output line 105 at line times two and fifteen. This information was recorded in character positions one hundred and twelve (112) and one hundred and thirty (130) of the control delay CD. (What information is recorded and how it is recorded will be explained later.) The information is indicated by the X in rows 1*b*, columns 16 and 34, of FIGURE 8. The character received during line time seven (character time ninety-seven) is stored in single character delay SCD2 which is just beginning a new cycle. The character remains in single character delay SCD2 for ninety-six (96) character times. This is indicated on row 6*b* of FIGURE 8. At character time one hundred and twelve (112) the information recorded in control delay CD actuates a transfer mechanism (which will be described later) which transfers the character stored in single character delay SCD2 to transport delay TD. Likewise, the information recorded in position one hundred and thirty (130) of control delay CD causes the information stored in single character delay element SCD2 to be transferred to position thirty-five (35) of transport delay TD during character time one hundred and thirty (130). This is indicated by the B in now 3*b*, columns 16 and 34, of FIGURE 8. The above explanation shows how a character is transferred from an input line to a single character delay element and from there to the transport delay element TD. Once information is on the transport delay element TD it is transferred to the memory 101 on line 105 the next time the particular character position of transport delay element TD coincides with a line time. For example, the information stored at character position thirty-five (35) in transport delay TD is transmitted to output line 15 during character time two hundred and twenty-five (225) (see column 15 of FIGURE 7) and the information stored in character position seventeen (17) of transport delay TD is transmitted to line 2 at character time seventeen (17) of the next cycle (see column 19 of FIGURE 7). Character positions seventeen (17) and thirty-five (35) on transport delay TD do not coincide with a line time at any character time previous to character times two hundred and twenty-five (225) and seventeen (17) as set out above.

The above described how one message character is transferred through exchange 102. A plurality of other message characters from other lines and to other lines may be simultaneously handled by exchange 102 and there will be no interference between them.

*Address setup mode*

The general operation of the system during the address setup mode will now be explained by use of FIGURE 9 which shows the synchronization which exists between certain selected elements at character time ninety-seven (97) during seven different machine cycles (columns 1, 2, 3, 9, 11, 13 and 19 of FIGURE 9). It also shows the synchronization at certain other selected character times during the various cycles.

Each address contained in a message consists of three address characters. Hence, exchange 102 must accumulate three characters from a particular input station before it can determine what an address is. This is indicated by columns 1, 2 and 3 in FIGURE 9. Column 1 indicates that a first address character is received from station L7 during character time ninety-seven (97). This character is stored in character position two (2) on storage delay SD. During the next machine cycle (column 2) a second address character which is part of the same address is received during character time ninety-seven (97) and this is again stored in character position two (2) on storage delay SD. Character position two (2) on storage delay SD is now storing two address characters. This is done by a reduced code which will be explained in detail later. The storage of address characters in storage delay SD is indicated by the A and A' in row 4*b*. During the third cycle the third address character of the particular addresses is received during character time ninety-seven (97) and by combining the third character with the two characters stored in position two (2) on storage delay SD the address proper is generated. This address is stored in the single character delay element then beginning a cycle. In the particular example shown single character delay element SCD3 is then beginning a cycle. Hence, the address herein designated by the capital letter C on row 7*a* is stored in single character delay element SCD3. This address remains in single character delay element SCD3 for ninety-six (96) character times, i.e., for ninety-six (96) cycles of single character delay element SCD3.

As explained previously, each character position on transport delay TD is associated with a particular input-output station, i.e., with a particular line time. When the character position in transport delay TD which is associated with the station whose address is C appears, the number of the single character delay element which will be associated with that input station during the next cycle is written on the control delay element CD. In the particular example shown in FIGURE 9, the address is that of station L2. By examining column 2 of FIGURE 7, it is noted that character position seventeen (17) on transport delay TD corresponds to station L2. Hence, when character position seventeen (17) of transport delay TD appears (column 4 of FIGURE 9) the number of the single character delay element which will be associated with this station during the next machine cycle is written on the position of control delay CD then available. In this case the number SCD4 is written in position one hundred and twelve (112) of control delay CD. For reasons which will be explained later the number written on the control delay is always one greater than the number of the single character delay element wherein the number is stored. In the example shown the address C is stored in SCD3 and the number of SCD4 is written on the control delay. During the next three cycles, three more address characters are received from station L7 and these address characters are again accumulated on the storage delay SD thereby forming a second address. For reasons which will be explained in detail later, the numbers stored on control delay CD are increased by one during each cycle. This is a very important point. As indicated in columns 10 and 12 of FIGURE 9, the number stored in character position one hundred and twelve (112) of transfer control delay CD is increased by one each cycle, that is, it is increased from four to five to six. When the third character of the second address is received, the address indicated thereby is stored in single character delay SCD6, which is the particular single character delay element then beginning a cycle. Again when the address stored in single character delay element SCD6 corresponds to the character position on the transport delay TD then appearing, the number of the single character delay element which will be associated with the originating input station during the next cycle of the transfer control delay CD is written on transfer control delay CD. In this case the address received (column 13) is the address of station L15. Position thirty-five (35) on the transport delay TD corresponds to station L15 (see column 15 of FIGURE 7). Character position thirty-five (35) on transport delay TD appears at the same time that character position one hundred and thirty (130) on control delay CD appears. Hence, the number of single character delay element SCD1 is written in character position one hundred and thirty (130) on the control delay CD.

At the same time that the number of a single character delay element is written into a particular character position on control delay CD a bit is written into the position of storage delay SD then appearing. This bit is hereinafter called the "reservation bit" and as will be seen in detail later it is used to insure that only one message is transmitted to any particular output station at one particular time.

During each address setup mode a character is only written on a character position of control delay CD (as shown in columns 4 and 17 of FIGURE 9) if the reservation bit in the character position of the storage delay then appearing is not set indicating that no other message is currently being transmitted to the particular line.

As shown in FIGURE 2, after all of the addresses associated with a particular message are received the control character MCF is received. During the cycle following the reception of the control character MCF the system switches from the address mode to the message mode. This is accomplished by setting a control bit in the character positions on the control delay CD wherein numbers of single character delay elements were written during the preceding address setup cycles. This is accomplished as follows. When the control character MCF is received the number of the single character delay element then beginning a cycle is written into itself. This is shown in column 19 of FIGURE 9, which shows what occurs when the control character MCF is received. At this time single character delay element SCD1 is then beginning a cycle. Hence, the number of single character delay SCD1 is stored in single character delay element SCD1. This is indicated on line 5*a* of FIGURE 9.

Figure 9:
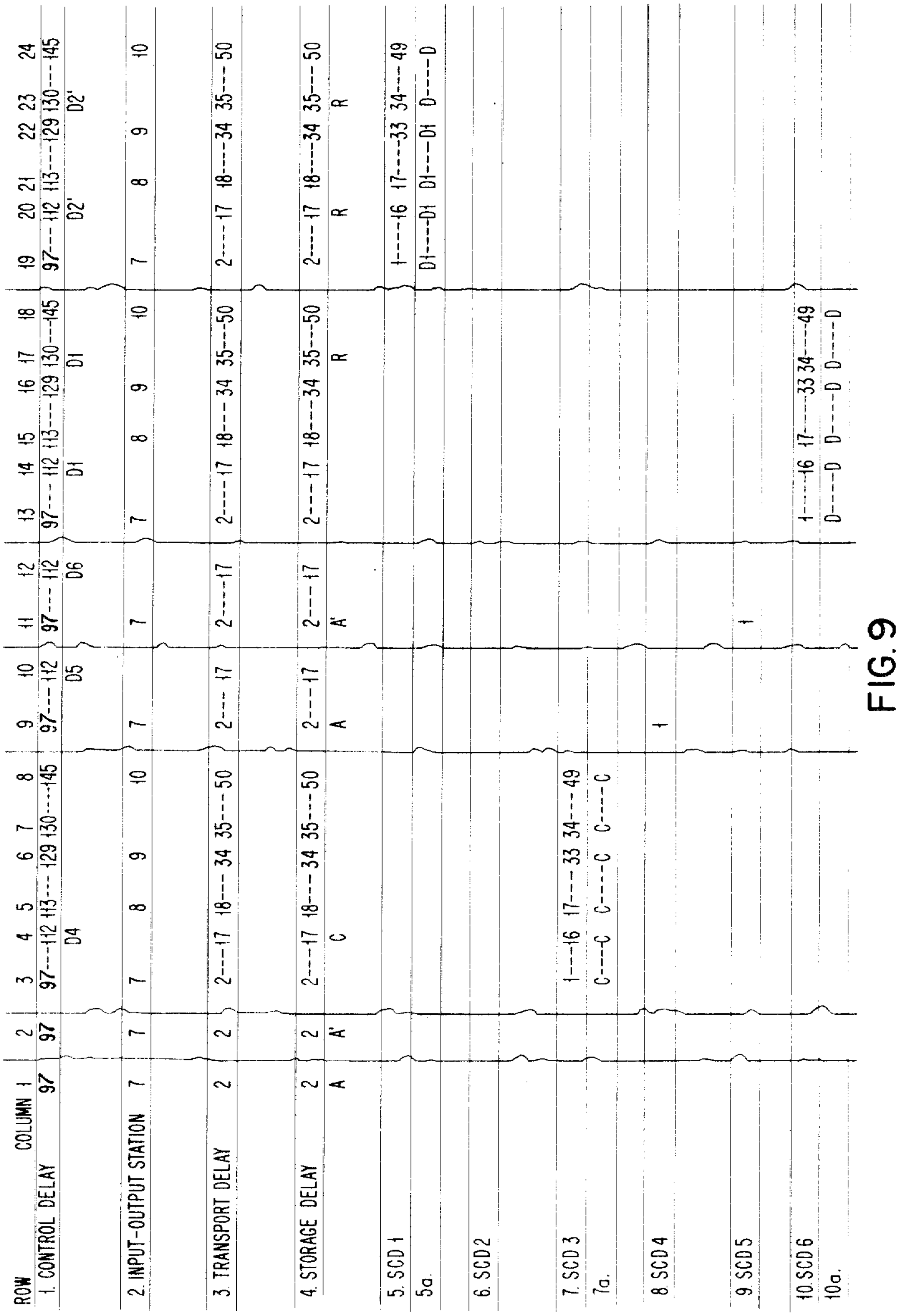
FIGURE 9 is a chart used to explain the address setup mode of operation.

During the next ninety-six (96) character times, the number stored in single character delay element SCD1 is compared to the number read from transfer control element CD (i.e., the number stored during the previous cycle) and where there is a comparison a particular bit (called the activation bit) is set as indicated by the prime notation in line 1*a* of FIGURE 9. In this case the number stored in single character delay element SCD1 corresponds to the read from control delay element CD during character times one hundred and twelve (112) and one hundred and thirty (130). Hence, the activation bit is set in positions one hundred and twelve (112) and one hundred and thirty (130) on control delay element CD. Note that row 1*a* of FIGURE 9 shows the number written on control delay CD during the particular character times and this number is one higher than the number which is read from the control delay during the same character time. This will be explained in detail later.

During the next cycle the system is in message mode and the transfer of message characters as previously explained takes place.

*Address erase mode*

After all of the characters of a particular message have been transferred the character EM appears. When this character appears the information stored on the control delay CD during the address setup mode which occurred at the beginning of the particular message must be deleted or erased. Furthermore, the reservation bits stored on the storage delay element SD must be erased.

This is accomplished in substantially the same way that the activation bits were set on control delay CD (columns 19 to 24 of FIGURE 9). When the control character EM occurs the number of the particular single character delay element then in use is written into itself. During the next ninety-six (96) character times this number is compared to the number stored on the control delay CD. When coincidence occurs the number stored on the control delay, the associated activation bit and the reservation bit on the storage delay SD are all erased. At the end of an address erase mode all of the control information established during the address setup mode associated with the same message is therefore erased.

*Interconnections between the major components in exchanger 102*

The interconnections between the various components in the exchange 102 are shown in FIGURE 10. FIGURE 10 is a composite drawing which consists of FIGURES 10*a* and 10*b*. The details of the logic inside each of the various components will be explained later.

*Recognition logic 110.*—This logic examines the characters arriving on line 104. Message characters are transmitted to control gate 113 via line A, address characters are transmitted to control gate 113 via line B. When a control character arrives by an input 104 recognition logic 110 selectively activates C, D and E according to the pattern shown below.

| Control Character | Meaning of Character | Line Activated |
|---|---|---|
| MCF | Message characters follow | C. |
| EM | End of message | D. |
| ACF | Address characters follow | E. |

*Control gate 113.*—All of the message characters received by control gate 113 via line A are sent to the single character delay elements SCD1 to SCD6 via line T3. Address characters received by control gate 113 are sometimes sent to the storage delay SD via line T2. As previously explained, each address is formed by three characters and the first two characters of an address are stored in storage delay SD until all of the three characters which form the address have been accumulated Thus, the first two characters of each address are sent to storage delay SD via line T2. These characters are returned to control gate 113 via line T1 at the proper time, that is at the same time that the third character of the address is arriving a control gate 113 via line B. After an address is accumulated, it is sent to the single character delay element SCD1 to SCD6 via line T3. Control gate 113 receives inputs designated C and D from recognition logic 110. Line C indicates that the characters which follow are message characters and line D indicates that the end of the message has arrived. Thus, signals on lines C and D tell control gate 113 what to do with the characters arriving on lines A and B. Control gate 113 also has three inputs designated T11, T12 and T13 which come from the logic 111 which is associated with control delay CD. As previously explained, each address is formed by three address characters. A count of the number of address characters which have already arrived is maintained in control delay CD (in a manner which will be explained in detail later), and the signals on lines T11, T12 and T13 indicate to control gate logic 113 whether the address character which it is then receiving is the first, second, or third character of an address. This information is conveyed to logic 112 via line T21.

*Single character delay logic 107.*—The particular single character delay element SCD1 to SCD6 into which a message character or address is directed is controlled by logic 107. Single character delay elements SCD1 to SCD6 are assigned to the incoming character in reverse cyclic order. That is, if a first character is stored in single character delay element SCD1, the second character arriving is stored in single character delay element SCD6, the third character is stored in single character delay element SCD5, etc. The result of the reverse cyclic order is that the characters from a particular line use the revolvers in forward cyclic order as previously explained (see FIGURE 7).

Characters on line T3 are directed into a particular single character delay element by multiplexing logical circuits 201 to 206. These circuits receive timing signals from timer 121 and in accordance with the timing signal assign the characters arriving on line T3 to a particular revolver. Logic 107 also controls the recycling of characters in single character delay elements SCD1 to SCD6. Each character which is stored in a single character delay element is recycled for ninety-six times. Multiplexing logic circuits 201 to 206 control the recycling operations in accordance with the signals received from timer 121.

The output of single character delay elements SCD1 to SCD6 appears on lines T31 to T36. Since each delay element only stores one character and since this character is continuously recycled therein until a new character is stored, the character stored in each delay element continually appears on the associated output line. As previously explained, each character consists of a seven bit. Thus, for example, if the character stored in single character delay element SCD1 consists of the seven bits *a* through *g* (as shown in FIGURE 4) the bits appearing on line T31 would be "*abcdefg abcdefg*, etc."

*Transport delay logic 109.*—Message characters appearing at the output of single character delay elements SCD1 to SCD6 are gated into transport delay element TD via transport delay logic 109. As previously explained, information stored on the control delay CD is used to control the transfer of characters from single character delay elements SCD1 to SCD6 into transport delay TD. Transport delay logic 109 receives signals from control delay CD via lines T14, T15, T16 and T17. Any information stored in transport delay TD is gated to output 105 when a character position in transport delay TD coincides with a line time. The gating of operation from transport delay logic TD to output 105 is controlled by timer 121. Each time that a line time signal appears on line L5 the character then appearing at the output of transport delay TD is gated from transport delay TD to output 105 by transport delay logic 109. The result is that the appropriate position on transport delay TD is always gated to output 105. For example, the coincidence of position sixty-six (66) on transport delay TD at line time eleven (11) (see column 11 in FIGURE 7) indicates that the machine is in character time one hundred and sixty-one (161) and that line time eleven (11) is being serviced. A line time never coincides with position sixty-six (66) on transport delay TD except during character time one hundred and sixty-one (161). Likewise, for each of the other positions on transport delay TD a line time will only coincide with the particular position when the associated line is being serviced.

*Single character number comparator 115.*—As previously explained when recognition logic 110 receives either control character MCF or control character EM, line C or D is activated and in response thereto single character revolver number comparator 115 compares the number stored in a selected one of the single character delay elements SCD1 to SCD6 to the numbers stored in the next ninety-six (96) character positions of the control delay CD. The signals which the single character revolver number comparator 115 generates when it detects coincidence between the number stored in the selected single character delay element and the numbers stored on the control delay CD, depend upon whether the system is in the address setup mode, or in the address erase mode. If the system is in the address setup mode and coincidence occurs, single character revolver number comparator 115 activates line T8 which sets the activation bit on control delay CD. If coincidence occurs during the address erase mode, single character revolver number comparator 115 activates lines T9 and T10. Activation of line T9 erases the reservation bit on the corresponding position in storage delay SD and activation of line T10, erases the number stored on the corresponding position of control delay CD. Single character revolver number comparator 115 includes six number comparator circuits 211 to 216. Each number comparator circuit 211 to 216 has five inputs, as follows:

(a) One of the lines T31 to T36 which supplies the number comparator logic with the output of one of the single character delay elements SCD1 to SCD6.

(c) Line D from recognition logic 110 which indicates whether the system is in address setup mode.

(c) Line D from recognition logic 110 which indicates whether the system is in address erase mode.

(d) An input T7 from control delay logic 111 which indicates the number stored in the character position of control delay CD then being read.

(e) Outputs from timer 121 which indicate which single character delay element should be read out.

The details of the logic in single character revolver number comparator circuits 211 to 216 will be described in detail later.

*Queue identification counter 119.*—This circuit generates the numbers 0 through 94. The numbers 0 through 94 in binary form are supplied on output T18. A different number is supplied on output T18 during each character time. Thus, ninety-five different numbers appear on line T18. Since storage delay SD and transport delay TD each have ninety-five (95) character positions which sequentially appear, each number generated by queue identification counter 119 is uniquely associated with one character position in transport delay TD and one character position in storage delay SD. Each time a particular character position is read from transport delay TD, a corresponding position is read from storage delay SD and the address appears upon line T18.

The address of an input-output station is not the same as the binary representation of the number of the particular input-output station. The reason for this will be explained later. The address of input-output station L1 is 0000000, the address of input-output station L2 is 0010000, the address of input-output station L3 is 0100000. This is shown in columns 1 and 3 of FIGURE 11C. In general the address which designates each input-output station is the binary representation of the number which is one less than the number of the character position on transport delay TD, which is available during the same character time. For example the address of input-output station L11 is 1000001 (i.e., the binary number sixty-five) since character position sixty-six (see column 11, FIGURE 7) on transport delay TD is then available.

The reason that this is done is because queue identification counter 119 sequentially generates the numbers zero through ninety-four (0 to 94) during each ninety-five (95) character times while the character positions on transport delay TD appear sequentially. Since adjacent positions on transport delay TD are associated with line times which occur ninety-seven (97) character times apart (see columns 1, 7 and 13 in FIGURE 7), the address of a line is different than its number. This complication could be eliminated by renumbering the lines, however in such a case indicating the particular character time that each line was associated with, i.e., FIGURE 3, would be much more complicated.

*Address comparator 117.*—Address comparator 117 compares the address stored in a selected one of the single character delay elements SCD1 to SCD6 to the number being generated by queue identification counter 119. If coincidence occurs and the reservation bit in storage delay SD indicates that the particular line is available, address comparator 117 sends the number of the single character delay element SCD1 to SCD6 then being read to control delay CD via line T4 and it also sends a signal to storage delay SD via line T6 which sets the reservation bit in the appropriate line so that it will not thereafter be used for another message. The signal on line T6 also activates line T106. The output of single character delay elements SCD1 to SCD6 are supplied to address comparator 117 via lines T31 to T36, the output of queue identification counter 119 is supplied to address comparator 117 via line T18, the status of the reservation bit in storage delay SD is supplied to address comparator 117 via line T5 and timing signals are supplied to address comparator 117 from timer 121.

*Detailed description of circuitry*

*Timer.*—Timer 121 shown in FIGURE 10*b* has three sets of outputs. The first set of outputs has eight output lines designated B1 to B8. Output lines B1 to B8 are sequentially activated during each character time. Signals on lines B1 to B8 therefore designate the eight bit times during each character time. The second set of outputs on timer 121 has three outputs which are respectively designated Q1, Q128 and TRS. As previously explained, each machine cycle is divided into one thousand five hundred and twenty (1520) character times. Every sixteenth character time is designated as a line time (see FIGURE 7). Output Q1 is activated during bit time B1 of each line time. Thus, output Q1 is only active for one bit time out of each one hundred and twenty-eight (128) bit times. Output Q128 is active during the eighth bit time of each character time which precedes a line time. Thus, like output Q1, output Q128 is only activated for one bit time out of each one hundred and twenty-eight (128) bit times. The activation of output Q1 follows the activation output Q128 by one bit time. Each set of one hundred and twenty-eight bits beginning at Q1 time and ending at Q128 time is hereinafter termed a line cycle time. Output TRS is activated during each bit time. This output is used to resynchronize or to reshape the pulse shape at various places in the system. The third group of outputs has six outputs designated TI–1, TI–2, TI–3, Not TI–1, Not TI–2 and Not TI–3. Outputs TI–1, TI–2 and TI–3 indicate the three bits of a binary number, hereinafter referred to as the single character delay element count. These outputs are sequentially activated so that the binary number indicated thereby cyclically goes through the values 654321654, etc. The signals on outputs TI–1, TI–2, and TI–3 change at the beginning of each line time. An example of the signals which appear on lines TI–1, TI–2 and TI–3 during a number of line times is indicated below. As will be seen later each count is not always associated with one particular line time, but the particular line time associated with each count changes on each cycle.

| TI-1 | TI-2 | TI-3 | Count Represented |
|---|---|---|---|
| 1 | 0 | 1 | 5 |
| 1 | 0 | 0 | 4 |
| 0 | 1 | 1 | 3 |
| 0 | 1 | 0 | 2 |
| 0 | 0 | 1 | 1 |
| 1 | 1 | 0 | 6 |
| 1 | 0 | 1 | 5 |
| 1 | 0 | 0 | 4 |

The signals appearing upon lines Not TI–1, Not TI–2 and Not TI–3 are the inverse of the signals appearing on lines TI–1, TI–2, and TI–3. That is, whenever line TI–1 is active, line Not TI–1 is inactive and vice versa. Whenever line TI–2 is active, line Not TI–2 is inactive and vice versa and whenever line TI–3 is active, line Not TI–3 is inactive and vice versa.

For ease of illustration, the connections between timer 121 and the various circuits are not explicitly shown. Instead, the various circuits which are activated by each output of timer 121 are merely designed by the same letter and number used to designate that particular output at the timer 121. For example, in FIGURE 11A, the input designated B2 to AND circuit 330 is activated by output B2 of timer 121. In order to further simplify the drawings, the inverse outputs Not TI–1, etc. are indicated on the drawing the conventional symbol of a bar over the symbol TI–1, etc.

*Address numbering scheme.*—The correspondence between each input station and one particular character position on transport delay TD and storage delay SD was previously explained with reference to FIGURE 8. It was also previously explained that the address of an input-output station is not the same as its number. FIGURE 11C shows in columns 1 and 2 the number of the particular character position on transport delay TD and on storage delay SD which is associated with the various input stations. The pattern by which this assignment is made was previously explained with reference to FIGURE 8.

Each position on transport delay TD and on storage delay SD also has a seven bit binary character associated therewith. This character shown in column 3 of FIGURE 11C is one form of the address of the associated input-output station. The seven bit binary character shown in column 3 is the seven bit address generated by queue identification counter 119 when the associated character position of transport delay TD and on storage delay SD is available. For example, row 3 of FIGURE 11C indicates that the seven binary bits 0100000 are associated with character position thirty-three (33) on transport delay TD. Furthermore, row 3 shows that character position thirty-three (33) on transport delay TD is associated with input-output station L3. As will be seen later, when the system receives three characters on input 104 which represent the address of input-output station L3, control gate 113 and storage delay SD convert these three characters to the seven binary bits 0100000 and these seven binary bits are then stored in one of the single character delay elements SCD1 to SCD6 as previously explained.

Column 4 of FIGURE 11C shows the three address characters which are placed in the first part of a message (see FIGURE 2) to represent each of the seven bit addresses shown in column 3. The highest order address character is used to represent the value of the highest order digit in the seven bit address, the second address character is used to represent the three middle digits in each seven bit address and the last address character is used to represent the three lower order bits of each address character. A particular array of binary bits represented by each of the allowable address characters is shown in FIGURE 11D. For example, the address character 2 indicates the bit array 110. The third column in FIGURE 11D shows the six bit code used for the transmisson of each allowable address character. In summary, messages can only use the address characters shown in column 1, FIGURE 11D. These address characters arrive on input 104 in the form of the seven bit characters shown in column 3, FIGURE 11D. Each address character represents a particular array of bits as shown in column 2, FIGURE 11D.

The reason that the particular codes described above were chosen is that they facilitate translation. For example, the binary bits represented by each allowable address character (column 2 of FIGURE 11D), are in the most part merely the last three bits of the seven bit code used to transmit each allowable address character (column 3 of FIGURE 11D). Furthermore, using the above described codes the storage of the first two address characters on storage delay SD is greatly facilitated. As will be explained in detail, only one binary bit may be stored on storage delay SD to represent the first character. Hence, only four binary bits are needed to store the first two digits of an address on storage delay SD.

*Control delay logic 111 and control delay CD.*—The details of control delay logic 111 and of control delay CD are shown in FIGURE 11A. Control delay CD consists of four series connected delay lines designated CD–1, CD–2, CD–3 and CD–4. The length of delay lines CD–1 to CD–4 is tabulated below:

CD–1 One thousand five hundred and eighteen character times
CD–2 One-half character time (four bit times)
CD–3 One character time (eight bit times)
CD–4 One-half character time (four bit times)
Total One thousand five hundred and twenty character times Delay elements CD–3 and CD–4 have multiple outputs. The input of control delay line CD–3 is designated CD–3A and the output is designated CD–3B. A signal applied at input CD–3A appears at output CD–3B one character time (eight bit times) later. As previously explained, each character time has eight bit times. If during one character time the eight bits of a particular charcter are introduced into input CD–3A of control line CD–3, four bit times later, the first bit of the character will appear on output T11, five bit times later the first bit will appear on output T12 and the second bit will appear at output T11, etc. until one character time later (eight bit times later) the first bit of the character will appear at output CD–3D, the second bit will appear at output T20, the third bit will appear at output T13, the fourth bit will appear at output T12 and the fifth bit will appear at output T11. By using delay lines having multiple outputs a plurality of bits of a character can be simultaneously interrogated.

Delay line CD–4 has an input of CD–4A, an output CD–4B and four taps designated T14, T15, T16, and T17. The operation of delay line CD–4 is similar to the previously explained operation of delay line CD–3.

For convenience of illustration in FIGURES 5 and 10*a*, the various segments of control delay CD were not shown and it should be understood that segment CD–1, CD–2, CD–3 and CD–4 together comprise the one thousand five hundred and twenty character control delay CD.

In the following description, the output CD–3B of delay line CD–3 is used as a reference to indicate the time at which certain action takes place. FIGURES 7, 8 and 9 indicate one particular character position in control delay CD which is available to control delay logic 111 during each character time in the machine cycle. The character referred to in FIGURES 7, 8, and 9 is the character position which is in control delay CD–3 during the particular character time. For example, column 16 in FIGURE 8 indicates that during character time one hundred and twelve (112) the particular character position which contains certain control information designated as X is available from control delay CD. This means that during the first bit time character time one hundred and twelve (112) the first bit of the character which contains the control information designated as X is appearing at output CD–3B, the second bit appears at output T20, the third bit appears at output T13, etc. During the second bit time of character time one hundred and twelve (112) the second bit of the forementioned character appears at output CD–3B, the third bit appears at output T20, the fourth bit appears at output T13, etc. At the beginning of the third bit time, the third bit of the character appears at output CD–3B, the fourth bit appears at output T20, the fifth bit appears at output T13, etc. Assuming the correct control signals are present to properly condition circuits 315 and 316, the bits appearing on outputs CD–3B pass through logical circuits 314, 315 and 316 and they are supplied to input CD–4A of delay line CD–4. Thus, at the beginning of the first bit time of character time one hundred and twelve (112) the first bit of the character containing the control information designated X is available at output T14. During the second bit time of character time one hundred and twelve (112) the first bit of the character containing information X is available at output T15 and the second bit of the character is available at output T14, etc.

The format used to store information in each character position in control delay CD will now be explained with reference to FIGURE 11B which shows the eight bits of repersentative character stored in control delay CD. Bit position one of each character is not used. Bit position two is used to indicate whether a message is being transmitted from the particular line which is associated with the particular character. If a one is stored in bit position two of a character in control delay CD, it indicates that the associated line is then transmitting a message through the exchange 102. For example, if a one is stored in bit position two of character position one thousand five hundred and five (1505), it indicates that line 95 (see column 17 of FIGURE 7) is transmitting a character to exchange 102 of line 104 during that particular charatcer time.

Bit positions B3 and B4 are used during the address setup mode to indicate the number of address characters of a particular address which have already arrived at exchange 102. As previously explained, each address is made up of three address characters. When the control character ACF arrives a 1 is stored in position B3 indicating that the next character from the same input station is the first character of an address. A 1 is also stored in position B3 when the last character of an address arrives to indicate that the next character from the same input station is the first character of an address. When the first address character of an address arrives, the 1 in position B3 is shifted to position B4 (leaving a 0 in position B3 and a 1 in position B4). This indicates that the next address character which arrives is the second character of an address. When the second character of an address arrives, a 1 is stored in position B3 (leaving a 1 in position B3 and a 1 in position B4) to indicate that the next address character which arrives from the same input stage is the third character of an address. The above is summarized in the following table:

| | | |
|---|---|---|
| When the first character of an address arrives. | Set bit position B3 to 0 and bit position B4 to 1. | Indicates that the next character from the same input station is the second character of an address. |
| When the second character of an address arrives. | Set bit position B3 to 1 and bit position B4 to 1. | Indicates that the next character from the same input station is the third character of an address. |
| When the control character ACF or when the third character of an address arrives. | Set bit position B3 to 1 and bit position B4 to 0. | Indicates that the next character from the same input station is the first character of an address. |
| When the control character MCF arrives. | Set bit position B3 to 0 and bit position B4 to 0. | Indicates that the next character from the same input station is a message character. |

Bit positions B5, B6 and B7 are used to store a binary number which identifies a particular one of the six single character delay elements SCD1 to SCD6. The following table shows what numbers in bit positions B5, B6 and B7 represent each one of the single character delay elements SCD1 to SCD6.

| Bit Positions | | | Single Character Delay, Element Identified Thereby |
|---|---|---|---|
| B7 | B6 | B5 | |
| 0 | 0 | 1 | SCD1 |
| 0 | 1 | 0 | SCD2 |
| 0 | 1 | 1 | SCD3 |
| 1 | 0 | 0 | SCD4 |
| 1 | 0 | 1 | SCD5 |
| 1 | 1 | 0 | SCD6 |
| 0 | 0 | 0 | None |

Bit position B8 is used to store a bit called the activation bit. When a 1 is stored in position B8 the character stored in the particular single character delay element identified by the number written in positions B5, B6 and B7 is transferred to transport delay TD. However, when a 0 is stored in position B8 no character is transferred to transport delay TD. A 1 is written in position B8 during the last cycle of each address setup mode. Hence, characters are not transferred to transport delay TD during the address set up mode, but they are transferred during subsequent cycles when the system is in message mode. Bit positions B5 to B7 of each character position in control delay CD are used in each character position; however, bit positions B2, B3, B4 and B8 are only used in character positions which are associated with line times (see FIGURE 7).

The logic in control delay 111 includes AND circuits 302, 306, 311, 312, 316 to 318, 330 to 332, and 334, triggers 303, 305, 313, OR circuits 301, 304, 315 and 319, inverter 333, EXCLUSIVE OR circuit 315, and one bit delay circuits 307, 335 and 336.

The seven logic circuits 301 to 307 increment the number stored in positions B5, B6 and B7 of each character by one during each cycle of control delay CD. This is done because successive message characters from the same input station do not go into the same single character delay element during successive machine cycles. As previously explained, the successive characters of any message sequentially use single character delay elements SCD1 to SCD6. This is shown in FIGURE 7. For example, in the particular machine cycles shown therein, the first character from input station L4 goes to single character delay elements SCD5 (see column 4) and the next character from input station L4 goes to single character delay element SCD6 (see column 21). A further example of how the numbers stored in bit positions 5, 6 and 7 must be incremented during each machine cycle is shown in FIGURE 9, columns 4, 10, 12, 14 and 20.

If no number is stored in bit positions B5, B6 and B7 it indicates that no transfer should be made from any of the single character delay elements SCD1 to SCD6 to transport delay TD during that character time. Hence, if bit positions B5, B6 and B7 are all set to 0, the number stored therein is not changed. If one of the binary numbers 001 through 101 is stored therein, it is increased by 1 and if the binary number 110 is stored therein, it is changed to 001. The seven possible states of bit positions B5, B6 and B7 is tabulated below. If these bit positions are in any one of the states 1 to 6, they are incremented to the next higher state and if these bit positions are in states 6, they are changed to state 1.

| State | Bit Positions | | |
|---|---|---|---|
| | B7 | B6 | B5 |
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 1 | 0 | 0 | 1 |
| 2 | 0 | 1 | 0 |

By examining the above chart, it is clear that if during any cycle any one of the bit positions is in the 1 state, the number in bit position B5 must be changed. This is accomplished by OR circuit 301, AND circuit 302, trigger 303, and EXCLUSIVE OR circuit 315. During bit time B4, lines T12, T13 and T20 are activated in accordance with the number stored in bit positions B5, B6 and B7. If any one of these bit positions is in the 1 state, the output of OR circuit 301 and the output of AND circuit 302 are activated during bit time B4, therefore activating the input of trigger 303. The output of trigger 303 is not activated until one bit time later, therefore during bit time B5 the output of trigger 303 is activated if any one of the bit positions B5, B6, or B7 was in the 1 state. The number stored in position B5 appears on output CD–3B at bit time B5. Hence, if the output of trigger 303 is active the output of EXCLUSIVE OR circuit 305 is active if a 0 is stored in bit position B5 and it is inactive if a 0 is stored therein. Thus, the value of the bit stored in bit position B5 is effectively changed as the character moves from delay line CD–3 to delay line CD–4 if a 1 is stored in any one of the positions B5, B6 or B7. This is the desired result, as explained above.

The output of AND circuit 306 is active during bit time B4 if a 1 is stored both in positions B6 and B7 of the character. The output of AND circuit 306 activates the set input of trigger 305 through delay circuit 307 which introduces a 1 bit delay. Trigger 305 requires one bit time to change state. Thus, the output of trigger 305 is activated at the beginning of bit time B6 if both positions B6 and B7 of a character have a 1 stored therein. Trigger 303 is reset through OR circuit 304 at bit time B5 and B6 if the output of EXCLUSIVE OR circuit 315 is a 1. The result is that if during bit times B5, B6 and B7 three zeros appear at output CD–3B, three zeros will be supplied to input CD–4A during bit times B5, B6 and B7, if a 1 appears at output CD–3B during bit time B5 and zeros appear at output CD–3B during bit times B6 and B7 a 0 is supplied to input CD–4A during bit time B5, a 1 will be supplied to input CD–4A during bit time B6 and a 0 will be supplied to input CD–4A during bit time B7, etc. The result is that a binary number stored in bit positions B5, B6 and B7 is cycled through six states having values of one to six as summarized in the table set out above.

The bits stored in positions B3 and B4 of each character are changed by the logical circuitry which includes AND circuits 331, 332 and 334, inverter 333 and single bit delay circuits 335 and 336. The output of AND circuit 331 is activated during bit time B3 if bit positions B3 and B4 both have 1 stored therein. Delay circuit 336 delays the signals appearing at the output of AND circuit 331 by one bit position. Thus, the output of delay circuit 336 activates one input to EXCLUSIVE OR circuit 315 at bit time B4 if both bit positions B3 and B4 have ones stored therein. The output of AND circuit 332 is activated at B3 time if position B3 has a one stored therein and position B4 has a zero stored therein. The output of AND circuit 332 both activates one input of EXCLUSIVE OR circuit 315 at bit time B3 if bit position B3 has 1 stored therein and bit position B4 has a 0 stored therein. The output of AND circuit 332 also activates the input of delay circuit 335. Delay circuit 335 delays the signal appearing at the output of AND circuit 332 by one bit position and thereafter activates an input of OR circuit 314. Thus, an input of OR circuit 314 is activated during bit time B4 if bit position B3 has a 1 stored therein and bit position B4 has a 0 stored therein. The output of AND circuit 334 activates an input of OR circuit 314 at bit time B3 if bit position B4 has a 1 position therein. The results produced by logical circuits 331 to 336 are tabulated below:

| Signals which appear on Output CD-3B | | Signals which are supplied to Input CD-4A | |
|---|---|---|---|
| Bit position B3 | Bit position B4 | Bit position B3 | Bit position B4 |
| 0 | 0 | 0 | 0 |
| 1 | 0 | 0 | 1 |
| 0 | 1 | 1 | 1 |
| 1 | 1 | 1 | 0 |

At the beginning of the address mode operation the control character ACF is received by recognition logic 110, and line E is activated which in turn activates the output of AND circuit 311 at bit time B3. This activates one input to OR circuit 314 thereby writing a 1 in bit position B3, which begins the above described cycle.

During the last cycle of each address setup mode trigger 313 and AND circuit 330 set bit positions B3 and B4 to the 0 state when the control character MCF is recognized by message recognition logic 110. This is accomplished as follows: When the control character MCF is received by message recognition logic 110, input C is activated and the output of AND circuit 330 is activated at bit time B2. The output of AND circuit 330 resets trigger 313. Trigger 313 is set at bit time B4 and it is normally on during bit times B1 to B8. Hence, the bits which appear at the output of OR circuit 314 are normally allowed to pass to the input of delay CD–4. However, when the control character MCF is received, line C is activated and trigger 313 is turned off during bit times B3 and B4. Hence, the bits stored in positions B3 and B4 are not allowed to pass through AND circuit 316 and 0's are supplied to the input of CD–4. Thus, zeros are stored in bit positions B3 and B4.

Line T19 is activated by AND circuit 317 to indicate that three address characters have been received and that the address comparator 117 can begin comparing addresses stored in a particular single character delay element with the addresses generated by queue identification counter 119. OR circuit 319 is used to enter the signals received from address comparator 117 in bit positions B5, B6 and B7. Address comparator 117 generates binary signals on line T4 during bit times B1, B2 and B3. These binary signals represent the number of a particular single delay element SCD1 to SCD6. During bit time B1, bit position B5 is available at the output of CD–4, during bit time B2 bit position B6 is available at the output of CD–4, and during bit time B–3 bit position B–7 is available at the output of CD–4. Thus, the signals received on line T4 during bit times B1, B2 and B3 are stored in bit positions B5, B6 and B7 of the characters on control delay CD.

AND circuit 318 is used to erase the numbers written in bit positions B5, B6 and B7. Line T10 is normally active, thereby allowing signals from the output of CD–4 to go to the input of CD–1; however, when the system is in address erase mode, single character delay number comparator 115 deactivates line T10 during bit times B1, B2, B3 and B4. During bit times B1, B2, B3 and B4 bit positions B5, B6, B7 and B8 are appearing at the output of CD–4 and the information stored therein is not allowed to pass through AND circuit 318 if input T10 is not active.

Input T8 is activated by single character delay number comparator 115 during the last cycle of each address setup mode when it detects coincidence between the number stored in a particular single character delay element and the number stored in bit positions B5, B6 and B7 of control delay CD. When single character delay number comparator 115 detects coincidence between the number stored in a selected single character delay element, it activates line T8 at bit time B8, thereby activating the input of OR circuit 314 and storing a 1 in bit position B8 of the character.

Exchange 102 only accepts and processes characters from each input station after it has received a signal on line F (at the appropriate time) which indicates that there is a message in memory 101 from the particular station which is ready to be processed by exchange 102. The signal on line F which indicates that there is a message in memory 101 from a particular station is sent during the character time assigned to the particular input-output station (see FIGURE 3). When line F is activated the output of AND circuit 312 is activated during bit time B2. Thus, activating one input of OR circuit 314 and transmitting a 1 to the input of delay line CD–4 at bit time B2 thereby storing a 1 in bit position two. As will be seen in detail later, characters received on input 104 are only processed if control gate logic 113 detects a 1 in bit position B2 of the character then appearing in delay CD–3.

*Storage delay SD.*—The storage delay SD is used for two purposes. First, it is used to store reservation bits which indicate which input-output stations are busy receiving messages, and second, it is used to store the first two characters of each address until the third character of the address arrives. FIGURE 11E shows how each character position on storage delay SD is used. Bit position B8 is used to store the reservation bit and bit positions B4, B5, B6 and B7 are used to store the first and second characters of each address. The address characters are stored in the previously explained reduced form whereby both characters can be stored within four bit positions.

As shown in FIGURE 11C, the high order character of each address is either a 0 or a 9. That is, the only two characters allowed in the high order character position of an address are the characters 0 and 9. When the first character of an address is received, a 0 is stored in bit position B7 in the corresponding character position on storage delay SD if the character is a 9 and a 1 is stored if the character is a 0. When the second address character of an address arrives, the three binary bits represented thereby (see FIGURE 11D) are stored in bit positions B4, B5, B6 of the corresponding character position on storage delay SD. In the third machine cycle when the third character of the address arrives an indication of the value of the first two address characters is available to control gate logic 113 and it gates the entire address to the single character delay elements SCD1 to SCD6.

Storage delay logic 112 (FIGURE 11F) includes AND circuits 351 and 352, EXCLUSIVE OR circuit 353, OR circuit 354 and inverter 355. When an address is to be stored on storage delay SD the bits thereof arrive at bit times B4, B5, B6 and B7 via line T2. They pass through OR circuit 354 and are stored in the appropriate positions. When the reservation bit in a character is to be set a signal arrives at line T6 at time B8 and is thus stored in an appropriate position. The output of storage delay SD is always available on line T1. Particularly at times B4, B5, B6 and B7 addresses stored in any character position are sequentially available on output line T1. Line T5 is normally active; however, it is deactivated by AND circuit 351 and inverter 355 during bit time B8 of any character time if the reservation bit in the particular character position was previously set to the one state. The information in storage delay SD is recirculated therein except when the system is in address setup mode, for a new 100's digit from the exchange in which case the old character space is cleared by omitting T21 which blocks recirculation. The reservation bit in position B8 is erased by EXCLUSIVE OR circuit 353 by a signal on line T9 at bit time B8.

*Control gate logic 113.*—(FIGURE 12) Control gate logic 113 receives characters on line A, address characters on lines B and T1 and control signals on lines C and D. The message characters which control gate 113 receives on line A are all transmitted to output T3. The first two characters of each address which control gate 113 receives on line B are directed to output T2. Later during the same character time that the third character of a particular address is received the first two characters arrive fom storage revolver SD on line 71. The first two characters are gated to output T3 after the third address character (i.e., which is the units digit) arrives on line B. This provides the previously described seven bit representation of the address which is stored in the appropriate single character delay element.

Control gate logic 113 includes AND circuits 374 to 386, OR circuits 390 to 395, triggers 360 to 363, delay circuits 396 and 397, and inverters 398 and 399. Input T13 is activated at time B8 by control delay logic 111 whenever a one bit appears in position B2 of the character which will arrive at the reference point in control delay CD during the next bit time. This indicates that there is a message in memory 101 which is ready for transmission from the input-output station associated with that particular character time. Activation of a line T13 through AND circuit 374 sets trigger 360 thereby conditioning AND circuit 375. If, during the character time that the character on control delay CD is passing the reference point, a message character arrives via line A, it will be transmitted through AND circuit 375 through OR circuit 391 to output line T3.

During bit time B8 lines T11 and T12 are activated in accordance with the character stored in bit position B3 and B4 of the character in control delay CD, which will begin to pass the reference point during the next bit time. The signals on lines T11 and T12 during bit time B8 indicate whether the system will be in address mode or in message mode during the character time which is about to begin. If the system is in address mode, these signals further indicate whether the next character which appears on input B is the first character of an address, the second character of an address or the third character of an address. The signals on lines T11 and T12 at bit time B8 sets triggers 361 and 362 through AND circuits 378, and 379. If the system is in message mode, triggers 361 and 362 are allowed to remain in the reset state and their zero outputs are active thereby conditioning AND circuit 375 to pass message characters from input A to output T3. If the signals on lines T11 and T12 indicate that the system is in address mode and that the address character about to arrive on input B is the high order character of an address, that is, the hundredth digit character, only trigger 361 is set at time B8. Hence, during the next character time the 1 output of trigger 361 is on and the 0 output of trigger 362 is on. The outputs of triggers 361 and 362 condition AND circuit 377. If the address arriving via line B has a 1 bit therein, the output of AND circuit 377 is activated thereby storing a 1 in delay line 397. As previously explained, the high order address digit will be either 000 or 001. Six bit times later this 1 appears at output T2 and it is stored in bit position B4 in storage delay SD (see FIGURE 11E). If the signals arriving via lines T11 and T12 indicate that the address character about to arrive on line B is going to be the second character of an address, only trigger 362 is set and during the next character time the 0 output of trigger 361 is on and the 1 output of trigger 362 is on. The 1 output of trigger 362 and the 0 output of trigger 361 conditions AND circuit 376 and the three bits arriving via line B which represent the address character are gated through AND circuit 376 and through OR circuit 395 into storage delay 396. Three bit times later the bits appear on output T2. If the signals on line T11 and T12 indicate that the address which is about to arrive via line B is the low order digit of an address, both triggers 361 and 362 are set. In this case the first and second address characters which were previously stored will arrive on line T1.

The 1 output of triggers 361 and 362 condition AND circuit 386. Thus, the bits arriving on line T1 from storage delay SD and the bits arriving on line B are passed through OR circuit 390, through AND circuit 386 and through OR circuit 391 to output T3. Output T21 is activated by AND circuit 381 and inverter 398 at all times except when trigger 361 is set and trigger 362 is reset, thereby indicating that the third address character is being received.

Trigger 363 is set by OR circuit 393 and AND circuit 380 during the last cycle of each address setup mode and during the address erase mode. When trigger 363 is set, the bits generated by AND circuits 382, 383 and 384 are passed through OR circuit 392, AND circuit 385, and OR circuit 391 to output T3. AND circuits 382 to 384 generate the three bits which represent the number of the particular single character relay element SCD1 to SCD6 which is then associated with the particular line time then being executed. Thus, the number of the appropriate single character delay element is transmitted via line T3.

*Multiplexing logic 107.*—(FIGURE 13) Multiplexing logic 107 shown in FIGURE 10*a* directs the signals which appear at the output of control gate 113 into the appropriate single character delay SCD1 to SCD6. Multiplexing logic 107 includes six circuits designated 201 to 206. Each of these circuits has identical logic therein, hence only the logic in circuit 201 (shown in FIGURE 13) will be explained in detail. Circuit 201 includes AND circuit 401, 402, 403 and 404, OR circuit 405 and inverter 406. AND circuit 401 includes four inputs, each of which must be active before the output thereof is activated. The first three inputs are signals TI–1, Not TI–2, and Not TI–3 from timer 121. These three lines are active when the single character delay element count of timer 121 is indicated by 001 designating the number of single character delay element SCD1. Input T24 is active when trigger 360 in control circuit 113 is set thereby indicating that a character is then being transferred from memory 101 to exchange 102 on line 104. When the output of AND circuit 401 is activated AND circuit 402 is conditioned and the signals appearing on input T3 pass through OR circuit 405 and through AND circuit 403 to line T201 which is the input of the associated single character delay element. AND circuit 403 reshapes pulses passing therethrough since line TRS is activated during the central portion of each bit time. The output of inverter 406 is activated whenever the output of AND circuit 401 is not activated; hence, AND circuit 404 is conditioned to pass signals appearing upon input T31 whenever AND circuit 402 is not conditioned to pass signals appearing upon input T3. Hence, either signals from input T3 are gated to the input of the associated single character delay element or the signals appearing upon input T31 from the output of the single character delay element are gated to the input thereof.

The logic in each of the other multiplexing circuits 202 to 206 is identical to the logic in circuit 201. However, the timing inputs to the corresponding AND circuits 401 are different. In circuit 202 the three inputs are active when the outputs of timer 121 indicate a single character delay element count of two, the inputs of AND circuit 401 in circuit 203 are active when the output of timer 121 indicates a single character delay element count of three, etc.

*Transport delay logic 109.*—(FIGURE 14) Transport delay logic 109 selectively gates the outputs of single character delay elements SCD1 to SCD6 into transport delay element TD. The gating operation is under control of signals appearing upon lines T14, T15, T16 and T17 during bit time B8. The signals that appear upon these inputs during bit time B8, indicate the information stored in positions B5, B6, B7, and B8 of characters which will begin passing the reference point in control delay CD during the next bit time. These signals thereby indicate which single character delay element SCD1 to SCD6 contains a character which should be gated into the transport delay TD beginning one bit time later.

Logic 109 includes triggers 415, 416, 417, and 418, AND circuits 425 to 436, OR circuits 437 and 438, and inverter 439. Triggers 415, 416 and 417 are set during bit time B8 in accordance with the numbers stored in positions B5, B6, B7 and B8 of each character which will begin passing the reference point on control delay CD during the next bit time. They are reset during bit time B7 of each character time; however, since they require one bit time to change state, these outputs are reset at bit time B8. The count stored in triggers 415, 416 and 417 is decoded into a one out of six code by AND circuits 428 to 433. If the number 001 is stored in triggers 415, 416 and 417, AND circuit 428 is conditioned thereby passing signals appearing upon input T31 from single character delay element SCD1 through OR circuit 439 and OR circuit 438 into transport delay TD. If the number 010 is stored, in triggers 415, 416, 417 AND circuit 429 is conditioned thereby passing signals appearing upon input T32 from single character delay element SCD2, through AND circuit 429, through OR circuit 430 and through OR circuit 438 into transport delay TD. Each of the other AND circuits 430 to 436 is likewise conditioned in accordance with the corresponding setting of the triggers 415, 416, and 417.

The characters appearing at the output of transport delay TD are recirculated through AND circuit 436 and OR circuit 438 except when the output of OR circuit 437 is active. The output of OR circuit 437 is activated during each line time by AND circuit 434 and trigger 418. AND circuit 434 is conditioned at the beginning of each time by Q1 signal and the first bit of each character (which is always a 1 in the particular code which is used). The output of AND circuit 434 activates one input of OR circuit 437 thereby activating its output. The output of AND circuit 434 also sets trigger 418 thereby activating its output and activating its second input or OR circuit 437. Trigger 418 remains set until bit time B8 of the same character time. During each line time one character is transmitted from the output of transport delay TD through AND circuit 435 to output 105. The result is that every sixteenth character appearing at the output of transport delay TD is transferred to output 105 whereas the other fifteen characters are again supplied to the input of the delay line. With reference to FIGURE 7, it can be seen that during line times 1, 2, 3, 4, 5, 6 and 7, character positions 1, 17, 33, 49, 65 and 81 are transmitted to output 105. During line times 7, 8, 9, 10 and 11, the character stored in positions 2, 18, 34, 50, 66 and 82 are transmitted to output 105. Thus, there is a precession between the positions in transport delay TD and the gating signals appearing at the output of OR circuit 437 whereby during each sixteen cycles of transport delay TD each position therein is gated to output 105 once and only once. This may be referred to as a precession between the gating signals and the character positions which appear at the output of transport delay TD. Transport delay TD is alternately termed the output delay element.

*Single character number comparator 115.*—Single character number comparator 115 (shown in FIGURE 10*b*) has six circuits 211 to 216, each of which has identical logic therein. The only difference between the circuits 211 to 216 is the signals applied thereto. Since the logic in each of these circuits is identical, only the logic in number comparator 211 (shown in FIGURE 15) will be explained.

Number comparator 211 (shown in FIGURE 15) includes triggers 450 and 451, AND circuits 453 to 457, OR circuit 460, EXCLUSIVE OR circuit 462 and inverter 463. The outputs of transfer control delay TD and the associated single character delay elements are compared by EXCLUSIVE OR circuit 462. The output of control delay CD appears on input T7 and the output of the associated single character delay element appears on input T31. The output of EXCLUSIVE OR circuit 462 is active whenever there is a difference between these signals. Input T7 through inverter 463 conditions AND circuit 456 at bit time B8 whenever the activation bit of a character is not set. Hence, output T211A can only be activated when the activation bit of a character is in the 0 state.

Trigger 450 is set during bit time B4 and it is only reset during bit time B5, B6, or B7 if there is a difference between (*a*) the single character delay element number arriving on input T7 from control delay CD and (*b*) the single character delay element number arriving on input T31 from the associated single character delay element. If trigger 450 is not reset by bit time B8 and if the bit arriving on input T7 at bit time B8 is 0 (i.e., if the reservation bit is not set), output 211A is activated through AND circuits 455 and 456. If trigger 450 is not reset by bit time B8 and if the bit arriving on input T7 at bit time B8 is 1 (i.e., if the activation bit of the character is set), the output of AND circuit 457 is activated thereby activating line output T211B which sets the reservation bit in the associated position of the storage delay element SD to 0.

Trigger 451 is set by AND circuit 454 during bit time B4 of the particular character time during which a character is being stored in the associated single character delay element if the output of OR circuit 460 is active. The output is only active when (*a*) there is a signal on line C indicating that the system is in the last cycle of an address setup mode or (*b*) when there is a signal on line D indicating that the system is in the address erase mode. The output of trigger 451 conditions AND circuit 455. Thus, unless AND circuit 455 is activated, none of the outputs of circuit 211 are activated. Trigger 451 is reset by AND circuit 553 ninety-six (96) character times after it is set. AND circuit 553 is activated by the timing code pattern 010 on TI–1, TI–2, TI–3 which occurs ninety-six character times after the pattern 001 which originally activated AND circuit 454.

*Address comparator 117.*—Address comparator 117 includes six circuits designated 221 to 226 each of which has identical logic circuitry. Since each of the circuits 221 to 226 has identical logic only the logic in address comparator circuit 221 (shown in FIGURE 16) will be explained in detail. The circuitry in circuit 221 includes triggers 475, 476, 477, AND circuits 480 to 484, and EXCLUSIVE OR circuit 485 and OR circuit 486. The function of address comparator logic 211 is to compare the number being generated by queue identification counter 114 which arrives at input T18 and the number stored in single character delay element SCD1 which arrives on input T31. Circuit 221 can only generate output signals when trigger 475 is set. Trigger 475 is only set by AND circuit 480 when (*a*) the address mode bits in bit positions B3 and B4 of the character in control delay CD which is about to begin passing the reference point indicate that the system is in address mode and (*b*) the single character delay element count at the output timer 121 is in the state 001.

Trigger 475 is reset by AND circuit 481 ninety-six (96) character times later. When trigger 475 is set, AND circuit 482 is conditioned and signals arriving on input T31 pass through AND circuit 482 and are compared to the signals, the output of EXCLUSIVE OR circuit 485 is not cuit 485. So long as there is coincidence between these signals, the output of EXCLUSIVE OR circuit 485 is not activated, but when there is no coincidence the output of EXCLUSIVE OR circuit 485 resets trigger 477 thereby deconditioning AND circuit 485 one bit time later. If there is coincidence between the signals arriving on line T18 and T31, the output of trigger 477 remains active and AND circuit 483 is conditioned to pass signals arriving on line T5. If a reservation bit on storage revolver SD is in the 0 state indicating that a particular line is available, the output of AND circuit 483 is activated during bit time B8 thereby setting trigger 476 and activating line T6 which writes a reservation bit in position B8, thereby reserving the particular line position. When trigger 476 is set, AND circuit 484 is conditioned. OR circuit 486 passes one or more timing bits during bit times B1, B2 and B3 which indicate the number of the associated single character delay element. (n.b. The particular OR circuit 486 shown in FIGURE 16 only passes one bit at time B2.) In this case there need not be an OR gate 486. In general case more than one timed bit appears here and an OR gate must be used. The binary number represented by the bits generated by OR circuit 486 are passed through AND circuit 484 to output T221 and from there to the control delay TD. For example, circuit 221 is associated with single character delay element SCD1 which is identified on control delay CD by the number 001 in bit positions B5, B6 and B7. OR circuit 487 produces a 1 bit at time B2. At bit time B2 bit position B6 is available at the output CD–4B of delay element CD–4 where line T221 is connected via OR circuit 227 (FIGURE 10*b*) and line T4. Hence, a 1 is stored in bit position B6 and the binary number 010 thus appears in bit positions B5, B6, B7. Note that instead of writing the number of the presently used SCD delay element (001) into the CD control delay, the following number (010) is written corresponding to the SCD element to be used by this message on the next machine cycle.

The only difference between circuit 221 and each of the other circuits 222 to 226 is the various inputs. For example, in circuit 221 trigger 475 is set when the single character delay element count at the output of the timer 121 is 001 and it is reset when the single character delay element count of the output of the timer 121 is 010, whereas the corresponding trigger in circuit 222 is set when the output of the timer 121 indicates a single character delay element count of 010 and reset when the output of the timer indicates a single character delay element count of 011. Likewise, in circuit 221 the output of OR circuit 486 indicates the number 010 whereas the output of the corresponding OR circuit in circuit 222 would indicate the number 011. That is, the input to the corresponding OR circuit 486 would be B2 and B3 timing signals. In circuit 223 the output of the corresponding OR circuit 486 is 100, hence it would have as input the B1 timing signal.

*Queue identification counter 119*.—Queue identification counter 119 includes two triggers 487 and 488, an EXCLUSIVE OR circuit 489, AND circuits 490 and 491, and an eight bit delay line 492. Queue identification counter 119 sequentially generates the binary number zero through ninety-four on output T18. That is, it sequentially generates the numbers 0000000 through 1011110, the various bits of each number sequentially appearing at its output. EXCLUSIVE OR circuit 489 and trigger 488 increment the number appearing at the output of delay line 492 by 1 during each character time. It requires one bit time for trigger 488 to turn on. When the count is zero the bit generated by trigger 488 passes through EXCLUSIVE OR circuit 489 through AND circuit 491 and it resets trigger 488. It will not appear at the output of delay line 492 until eight bit times later. One bit time before the bit appears at the output of delay line 492 the reset input of trigger 488 is actuated, hence the first bit appearing at the output of delay line 492 will not pass through EXCLUSIVE OR circuit 489; however, during the next bit time a bit generated by trigger 488 will pass through EXCLUSIVE OR circuit 487. This resets trigger 488. The count stored in delay line 492 is then two. This procedure continues, the count being incremented by 1 during each cycle until the count of ninety-four (94) is reached. When the binary number ninety-four (94) is stored in delay line 492, AND circuit 480 sets trigger 487 at B8 time. The output of trigger 488 is also activated at the same time. This activates two inputs of EXCLUSIVE OR circuit 489 thereby deactivating its output, and setting the count to zero. Trigger 487 is reset at B7 time thereby starting a new cycle.

*Message recognition logic 110*.—The details of message recognition logic 110 are shown in FIGURE 18A. Message recognition logic 110 includes an eight bit tapped delay line 501, a translator 502, eleven signal generating circuits 503 to 510 and 513 to 515, and an OR circuit 516. Message recognition logic 110 receives characters via line 104. Each bit of each character is delayed for one character time and then transmitted on output line A. Translator 502 has seven inputs from delay line 501. At B8 time an entire character supplied by input 104 is stored in delay line 501 and six significant bits of the character are supplied to translator 502. Each eight bit character received on input 104 only has six significant bits because the eight bit is used as a parity bit and the first bit is always set to the one state as a timing or synchronization bit.

Translator 502 detects whether the character which is stored in delay line 501 at B8 time represents one of the address characters shown in the third column of FIGURE 11D or whether it represents one of the control characters EM, MCF or ACF which, for example, could respectively be represented by the bit configuration 100001, 100010 and 100100.

When translator 502 detects one of the address characters or one of the control characters, it activates one of the circuits 503 to 510 or 513 to 515. When an address character is detected, one of the circuits 503 to 510 is activated. Each circuit 503 to 510 generates the three bit code shown in the second column of FIGURE 11D which corresponds to the associated six bit code shown in the third column of FIGURE 11D. The output generated by circuits 503 to 510 pass through OR circuit 516 to output B. When one of the control characters is detected the associated circuit 513 to 515 is activated. When one of the inputs to circuits 513 to 515 is activated, its output is activated and held active for one character time, i.e., eight bit-times.

The details of circuits 503 to 510 will be explained with reference to FIGURE 18B and the details of circuits 513 and 515 will be explained with reference to FIGURE 18C. FIGURE 18B shows details of circuit 503. Each of the other circuits 504 to 510 are logically identical to circuit 503 shown in FIGURE 18B. Circuit 503 includes OR circuit 520, AND circuits 521 and 522 and trigger 523. When translator 502 activates line 503A the output of AND circuit 522 sets trigger 523 through AND circuit 522 at time B8. The output of trigger 523 conditions AND circuit 521 so that the output of OR circuit 520 can pass through AND circuit 521 to output 503B. The inputs to OR circuit 520 comprise the particular timing bits which generate the bits which represent the character with which the circuit is associated. For example, circuit 503 is associated with the address zero which is represented by the binary bits 001 (see FIGURE 11D), OR circuit 520 therefore merely has one input, namely, the B1 timing pulse and hence only this bit appears on output 503B. Naturally, in this case OR circuit 520 is not necessary. Each of the other circuits 504 to 510 has a different combination of timing bits as inputs to the OR circuits which correspond to OR circuit 520. Where the particular character is represented by more than one bit, the OR circuit corresponding to OR circuit 520 will have more than one input. Trigger 523 is reset at bit time B7 thereby deactivating one of the inputs to AND circuit 521 at B8 time.

Each of the circuits 513 to 515 is identical to circuit 513 which is shown in detail in FIGURE 18C. Circuit 513 includes OR circuit 530, trigger 531 and AND circuit 532. When input 513A is activated at B8 time, output 513B is immediately activated through OR circuit 530. Input 513A also activates the set input of trigger 531, thereby activating the second input of OR circuit 530 one bit time later. This enables output 513B to remain on for an entire character period until trigger 531 is reset at bit time B7.

*Details of the logical blocks.*—The present invention is not particularly related to the details of the logical circuitry shown herein and any of the various different types of logical circuitry known in the art could be used to implement the present invention. It should be noted however that the timing of the various circuits shown herein is designed on the basis that each trigger introduces approximately a one bit delay between the time that the input is activated and the time that its output responds. It is further assumed that the output of various other logical circuits except the delay elements respond almost instantaneously when their inputs are activated (relative to the length of a bit time). The symbology used to represent the triggers is conventional. It indicates that each input of the trigger is effective to activate the output line which is located directly across the block and to deactivate the output which is not located directly across the block.

*Queuing memory 101.*—Queuing memory 101 includes multiplexing logic and character storing logic. The details of queuing memory 101 form no part of the present invention and these components may be fabricated using conventional logic. Alternately, queuing memory and multiplexer 101 may be fabricated as taught in U.S. patent application Serial Number 243,063, entitled "Message Routing Systems" by John A. McLaughlin, filed December 7, 1962, IBM Docket 19059, which application is assigned to the assignee of the present invention. As shown in the above referenced application, the queue for each line has a count associated therewith which indicates the length of the queue. Signals on line 106 would merely activate a subtraction circuit which would shorten this count by three. The signals on line F can come directly from the various input-output stations (through time multiplexing circuitry). The line is activated by each station after it finishes sending a message to memory 101.

*General summary*

Input-output stations L1 to L95 each can transmit and receive messages. Each message is composed of a series of characters in the format shown in FIGURE 2. There are three different types of characters, control characters, address characters and message characters. The address characters in each message designate which input-output stations are to receive the particular message, the message characters carry the actual message, and the control characters designate the beginning and end of each message and they separate the address characters from the message characters. There are three types of control characters. The first type of control character designated ACF indicates that address characters follow. The second type of control character designated MCF indicates that message characters follow and the last type of control character designated EM indicates that this character is the end of a message.

Messages are transmitted from the various input-output stations through queuing memory 101 to exchange 102 back through queuing memory 101 and then to input-output stations L1 to L95. Transmission between queuing memory 101 and exchange 102 is on a time multiplex basis, as shown in FIGURE 3. The operation of exchange 102 and queuing memory 101 is based upon a cycle which has one thousand five hundred and twenty (1520) character times. Messages are received and transmitted via lines 104 and 105 only during ninety-five (95) of each one thousand five hundred and twenty (1520) character times. As shown in FIGURE 3, during character time one, queuing memory 101 can transmit and exchange 102 can receive via line 104 a message character which originated at input-output station L1 and likewise exchange 102 can transmit and queuing memory 101 can receive via line 105 a message character which is to go to input-output station L1. During character time seventeen, queuing memory 101 can transmit and exchange 102 can receive via line 104 a message character which originated at input-output station L2, and likewise during character time seventeen exchange 102 can transmit and queuing memory 101 can receive via line 105 a character which is to be received by input-output station L2. Thus, each input-output station has a particular character time associated therewith during which a message character can be transmitted from queuing memory 101 to exchange 102 and a message character can be transmitted from exchange 102 to queuing memory 101. The character times during which characters can be transmitted between queuing memory 101 and exchange 102 are termed line times. The line times which are associated with each input-output station are separated by one thousand five hundred and nineteen (1519) character times. Thus, successive characters of a particular message arrive at exchange 102 separated by one thousand five hundred and nineteen (1519) character times.

Each message transmitted from an input-output station to queuing memory 101 is stored therein and transmitted to exchange 102 at the appropriate times. In general, once a character is transmitted from queuing memory 101 to exchange 102 it is not destroyed, instead it is recirculated in memory 101. As transmitted from memory 101 to exchange 102, the address of each input-output station is composed of three address characters. After exchange 102 receives three address characters from a particular message it determines whether the particular input-output station indicated thereby is free to receive the particular message. If the particular input-output station is free, exchange 102 sends a signal to memory 101 via line 106 which indicates that three characters should be deleted from the associated recirculating queue in memory 101. Thus, when the message is again sent to exchange 102 the address of the input-output station which previously received the message is no longer contained in the message and the message is not again sent to this same input-output station.

As shown in FIGURE 5, exchange 102 includes nine delay elements. There are six single character delay elements designated SCD1 to SCD6, a transport delay element designated TD, a control delay element designated CD and a storage delay element designated SD. Single character delay elements SCD1 to SCD6 are each one character in length, that is, a character applied to the input of any one of these delay elements appears at the output thereof one character time later. Transport delay TD and storage delay SD are ninety-five (95) characters long and control delay CD is one thousand five hundred and twenty (1520) characters long. Each character position in transport delay TD and in control CD is associated with a particular input-output station. This association is shown in FIGURES 7 and 11C. The various character positions in control delay CD are also associated with particular input-output stations. However, each of the character positions on control delay CD are not used in the same manner. The ninety-five (95) character positions in control delay CD which are available during the ninety-five (95) line times are used as shown in FIGURE 11D. In the other character positions in control delay CD only bit positions B5, B6, B7 and B8 are used. Exchange 102 also includes (*a*) queue identification counter 119 which sequentially generates the ninety-five (95) binary numbers zero to ninety-four (0 to 94), (*b*) single character number comparator 115 which compares the numbers stored in a particular one of single character delay elements SCD1 to SCD6 to the numbers stored in bit positions B5, B6 and B7 of characters in control delay CD, and (*c*) address comparator 117 which compares the address generated by queue identification counter 119 to the address stored in a selected one of the single character delay elements SCD1 to SCD6.

Single character delay elements SCD1 to SCD6 are assigned to the input-output stations in reverse cyclic order. Once a single character delay element is assigned to a particular input-output station, it remains assigned thereto for ninety-six (96) character times. For example, as shown in column 1 of FIGURE 7 during character time one (1) single character delay element SCD2 is assigned to input-output station L1. During the next line time, single character delay element SCD1 is assigned to input-output station L2 and during the next line time single character delay element SCD5 is assigned to input-output station L3. The result is that during the first character time of the next machine cycle, single character delay element SCD3 is assigned to input-output station L1 and during the next time single character delay element SCD2 is assigned to input-output station L2. Thus, successive characters of a particular message sequentially use the various single character delay elements. If the first character of a message uses single character delay element SCD2, the next character will use single character delay element SCD3, etc.

The operation of exchange 102 is divided into three different modes respectively designated the address setup mode, the message mode and the address erase mode. During the address setup mode, a path is established through exchange 102 for subsequent message characters associated with the same input-output station. During the message mode, message characters are routed through exchange 102 to output 105 in accordance with the address characters previously received and during address erase mode the path previously established for message characters through the exchange 102 is disenabled or erased. The operation of the system during each of the various modes will now be explained.

*Address setup mode.*—The address setup mode is initiated when recognition logic 110 recognizes the character ACF which indicates that address characters follow. Before exchange 102 can determine what an address is so that it may set up the appropriate path it must accumulate three address characters. The accumulation of the characters is complicted by the fact that the characters arrive on line 104 on a time multiplex basis, each being separated by one thousand five hundred and nineteen (1519) character times. The first two address characters of each address are stored in a compressed code in the particular character position on storage delay SD which is associated with the particular input-output station which sent the message which contained the particular address characters. When the third character of an address arrives, the first two characters are read from storage delay SD and the complete address is stored in a particular one of the single character delay elements SCD1 to SCD6. During the next ninety-six (96) character times, address comparator 117 compares the number stored in the single character delay element to the number generated by the queue identification counter 119. Queue identification counter 119 generates a number which identifies the particular input-output station which is associated with the position on transport delay TD which is then available to logic 109. This, in effect, compares the address which was supplied to exchange 102 to the ninety-five (95) character positions in transport delay TD. When the position in transport delay TD corresponding to the particular address is available to transport delay logic 109, address comparator 117 detects coincidence between the number stored in the single character delay element and the number generated by queue identification counter 119. At the same time the position in storage delay SD which corresponds to the particular address is also available. If no other line has reserved this position, that is, if a message is not being transmitted from one of the other input-output stations to this particular line, the reservation bit, in the particular character position of storage delay SD then available is not set and storage delay logic 112 activates line T5. Address comparator 117 therefore knows that the particular station is available and it generates a signal on line T6 to set the reservation bit on storage delay SD at the particular character position. When there is comparison and the reservation bit is not set, comparator 117 also generates on line T4 the number of single character delay element which will be associated with the particular station during the next cycle. This number is stored in the position of the control delay CD then available to control delay logic 111. The above procedure accomplishes two things. First, it reserves the use of a particular output station and thereby a particular character position on transport delay TD by setting a reservation bit in storage delay SD and second, it places the number of the appropriate single character delay element on control delay CD to control the transfer of subsequent message characters through the system. The number on control delay CD is not effective to route subsequent characters until a bit called the activation bit is set. The activation bit is only set after the control character MCF is received indicating the subsequent characters are message characters.

After one route is established by setting a reservation bit on storage delay SD and by storing control information on control delay CD another address is accumulated. Thus, during the next three machine cycles, if the designated address is free, another position is reserved in transport delay TD in the same way. Positions are reserved in transport delay TD until the control character MCF is received indicating that there are no further addresses.

The above description merely describes the reservation procedure being carried on in response to the addresses received from one particular input-output station. It should be noted that this reservation procedure may be simultaneously taking place for several different messages from several different input-output stations. Address comparator 117 can simultaneously compare the number stored in several of the single character delay elements SCD1 to the number generated by the queue identification counter 119. A problem situation could arise if two input-output stations attempt to set up a route to the same station at the same time. That is, if the same address is simultaneously stored in two of the single character delay elements an error condition might result. This could easily be taken care of by providing logic at the output of the single character delay element SCD1 to SCD6 which would be operative when a plurality of the single character delay elements are storing addresses and which would establish some priority when two of the single character delay elements had the same address stored therein. In the present system in the sake of economy and since such an error condition is highly unlikely to occur, such circuitry has not been provided.

When the control character MCF is received, it indicates that all the address characters associated with the particular message have been processed and that the following characters will be message characters. The control character MCF switches the system from the address setup mode to the message mode. This is accomplished by setting the activation bits in those positions on control delay CD wherein the numbers of single character delay elements had previously been stored. This is accomplished as follows: The number of the single character delay element then assigned to the particular line which originated the message is written into that particular single character delay element. Thereafter, for ninety-six (96) character times the single character delay element number comparator 115 compares this number to the numbers being read from control delay CD. When coincidence occurs the activation bits in the particular character positions are set, thus all the activation bits associated with the particular message are set during one machine cycle, and the machine is thereafter in the message mode for this line only. Other lines operate independently and may be in the address mode or the message mode at any one time.

Each time during an address setup mode when address comparator 117 detects that a particular position in the transport delay TD can be reserved it activates line T6. Line T6 activates line T106 which signals queuing memory and multiplexer 101 that the last three characters which were sent to exchange 102 should not be recirculated. Thus, if each of the addresses at the beginning of a message are available, none of these addresses are recirculated and the message associated with the particular line in queuing memory 101 will thereby have the control character ACF followed immediately by the control character MCF. Queuing memory 101 may have recognition logic therein which recognizes this condition and in response thereto deletes the message from the memory on subsequent cycles. Such circuitry is conventional, it forms no part of the present invention and since the present invention can operate without it, it is not described herein. If one or more of the addresses is recirculated after the system has transmitted the message to the input-output stations which are available the system will again try to transmit the message to those input-output stations which were previously unavailable.

*Message transfer mode.*—The message transfer mode is initiated when recognition logic 110 detects the control character MCF. In response to the control character MCF recognition logic 110 activates line C and thereafter transmits the message characters to control gate 113 via line A. Each character received is sent to one of the single character delay elements SCD1 to SCD6 and allowed to remain therein for ninety-six (96) character times. Each time that a number of one of the single character delay elements is read from control delay CD the character stored in the appropriate single character delay element is transferred to transport delay TD via transport delay logic 109. Thus, if during an address setup mode the number of a particular single character delay element is stored in control delay CD in five different places, during the subsequent message transfer modes for this channel each message character stored in a particular single character delay element will be transmitted to transport delay TD five different times and stored therein in the positions associated with the particular addresses.

Each position in transport delay TD is associated with a particular line and each position is read out of transport delay TD when the associated line time arrives.

*Address erase mode.*—After all the message characters of a particular message have been transmitted to those addresses which were enabled during the previous address setup mode, these addresses must be disenabled when the control character EM arrives which indicates the end of the message. During the address erase mode the numbers stored in the control delay CD which cause the transfer of message characters from a particular single character revolver to certain positions in the transport delay TD must be erased. This is accomplished in a manner similar to the way in which the activation bits are written in the control delay CD. When the control character EM is received the number in the single character delay element then being used by a particular line is written into this particular single character delay element. For the next ninety-six (96) cycles this number is compared to the numbers stored on the control delay CD. When coincidence occurs, lines T9 and T10 are activated which respectively erase the reservation bit of storage delay SD and erase the number from control delay CD.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. A message exchange system comprising
an input for receiving data characters from a plurality of stations on a time multiplex basis,
first means for supplying information indicating the desired destination of said characters,
a plurality of single character delay elements,
a transport delay element having one character position for each station,
means for storing each message character in a single character delay element and for recirculating each message character therein for one cycle of said transport delay element, and
means for transferring message characters from said single character delay elements to said transport delay element in response to said first means.

2. A message exchange system comprising a plurality of stations
an input for receiving data characters from said plurality of stations on a time multiplex basis,
first means for supplying information indicating the desired destination of characters,
a plurality of single character delay elements,
means for storing characters received on said input in said single character delay elements and for recirculating each character therein a plurality of times,
an output delay element having one character position for each station, and
means for selectively transferring characters from said single character delay elements to specified positions on said output delay element which are associated with the line times of the desired destination and as determined by the information stored in each character position of said first means.

3. In a message exchange system
the operation of which is based upon a machine cycle which has a plurality of character times, said machine cycle also being divided into a plurality of line cycle times, each line cycle time including a plurality of character times, the first character time in each line cycle time being termed a line time,
an input for receiving messages from a plurality of stations on a time multiplex basis one station being associated with each line time,
the successive characters of a message from a particular station being received during successive line times associated with the station where said message originated,
a recirculating control memory element which has one character position associated with each character time in a machine cycle,
means for storing control information in said control memory element,
a plurality of single character delay elements,
means for storing characters received on said input in said single character delay elements and for recirculating each character therein a plurality of times,
a transport delay element having one character position for each input station,
means for selectively transferring characters from said single character delay elements to specified positions on said transport delay element which are associated with the line times of the desired destination and as determined by the information stored in each character position of said control memory element,
means for recirculating characters appearing at the output of said transport delay element to the input thereof except during line times,
output means, and
means for transferring characters from said transport delay element to said output means during line times, whereby a character stored in a particular position on said transport delay element appears on said output means during the line time associated with said particular position.

4. In a message exchange system the operation of which is based upon a machine cycle which has a plurality of character times, said machine cycle also being divided into a plurality of line cycle times, each line cycle time including a plurality of character times, the first character time in each line cycle time being termed a line time, an input for receiving messages from a plurality of stations on a time multiplex basis one station being associated with each line time, the successive characters of a message from a particular station being received during successive line times associated with the station where said message originated, first means for supplying information indicating the desired destination of said characters, a plurality of single character delay elements, means for storing characters received on said input in said single character delay elements and for recirculating each character therein a plurality of times, an output delay element having one character position for each input station, means for selectively transferring characters from said single character delay elements to specified positions on said output delay element which are associated with the line times of the desired destination and as determined by the information stored in said first means, an output, and means for transferring characters from said output delay element to said output, whereby characters destined for various stations appear on said output on a time multiplex basis.

5. In a message exchange system the operation of which is based upon a machine cycle which has a plurality of character times, said machine cycle also being divided into a plurality of line cycle times, each line cycle time including a plurality of character times, the first character time in each line cycle time being termed a line time, an input for receiving messages from a plurality of stations on a time multiplex basis one station being associated with each line time, the successive characters of a message from a particular station being received during successive line times associated with the station where said message originated, a plurality of single character delay elements, means for storing characters received on said input in said single character delay elements and for recirculating each character therein a plurality of times, a recirculating control delay element having one character position associated with each character time of said machine cycle, means for storing control information in said recirculating control delay element, an output delay element having one character position for each input station, means for selectively transferring characters from said single character delay elements to specified positions on said output delay element which are associated with the line times of the desired destination and as determined by the information stored in each character position of said control delay element, an output, and means for transferring characters from said output delay element to said output, whereby characters destined for various stations appear on said output on a time multiplex basis.

6. A message exchange system the operation of which is based upon a machine cycle which has a plurality of character times, said machine cycle also being divided into a plurality of line cycle times, each line cycle time including a plurality of character times, the first character time in each line cycle time being termed a line time, comprising an input for receiving messages from a plurality of stations on a time multiplex basis one station being associated with each line time, the successive characters of a message from a particular station being received during successive line times associated with the station where said message originated, each message having a plurality of address characters for indicating the particular stations to which the message is directed, followed by a plurality of message characters which comprise the message proper, a plurality of single character delay elements, a transport delay element having one character position for each input station, means for storing an address which indicates the destination of a message in one of said single character delay elements and for recirculating said address for the time required for a character to travel through said transport delay element, a recirculating control delay element having one character position associated with each character time of said machine cycle, and means for supplying control information to the input of said control delay element when the address stored in a particular single character delay element coincides with the character position of said transport delay element then appearing at the output thereof thereby effectively establishing a path through said exchange for subsequent message characters.

7. A message exchange system the operation of which is based upon a machine cycle which has a plurality of character times, said machine cycle also being divided into a plurality of line cycle times, each line cycle time including a plurality of character times, the first character time in each line cycle time being termed a line time, comprising an input for receiving messages from a plurality of stations on a time multiplex basis one station being associated with each line time, the successive characters of a message from a particular station being received during successive line times associated with the station where said message originated, each message having a plurality of address characters for indicating the particular stations to which the message is directed, followed by a plurality of message characters which comprise the message proper, a recirculating control delay element having one character position associated with each character time of said machine cycle, means for recognizing said address characters and for storing control information in said control delay element, for routing successive message characters through said exchange, a plurality of single character delay elements, means for storing characters received on said input in said single character delay elements and for recirculating each character therein a plurality of times, a transport delay element having one character position for each input station, and means for selectively transferring message characters from said single character delay elements to specified positions on said transport delay element which are associated with the line time of the desired destination and as determined by the information stored in each character position of said control delay element.

8. In a message exchange system the operation of which is based upon a machine cycle which has one thousand five hundred and twenty character times, said machine cycle also being divided into ninety-five line cycle times, each line cycle time including sixteen character times, the first character time in each line cycle time being termed a line time, an input for receiving messages from ninety-five stations on a time multiplex basis, one character arriving on said input during each line time, successive characters of each message therefore being separated by one thousand five hundred and nineteen character times, a recirculating control delay element having information stored therein indicating the desired destination of each character, six single character delay elements, means for storing successive characters received on said input in said single character delay elements and for recirculating each character therein ninety-six times, a transport delay element having ninety-five character positions, means for transferring characters from said single character delay elements to specified positions on said transport delay element which are associated with the line times of the desired destination and as determined by the information stored in each character position of said control delay element, means for recirculating characters appearing at the output of said transport delay element to the input thereof except during line times, output means, and means for transferring characters from said transport delay element to said output means during line times, whereby a character stored in a particular position on said transport delay element appears on said output means during the line time associated with said particular position.

9. In a message exchange system the operation of which is based upon a machine cycle which has a plurality of character times, said machine cycle also being divided into a plurality of line cycle times, each line cycle time including a plurality of character times, the first character time in each line cycle time being termed a line time, an input for receiving messages from a plurality of stations on a time multiplex basis one station being associated with each line time, the successive characters of a message from a particular station being received during successive line times associated with the station where said message originated, a recirculating control memory element which has one character position associated with each character time in a machine cycle, means for storing control information in said control memory element, a plurality of single character delay elements, means for storing characters received on said input in said single character delay elements and for recirculating each character therein a plurality of times, a transport delay element having one character position for each input station, and means for selectively transferring characters from said single character delay elements to specified positions on said transport delay element which are associated with the line times of the desired destination and as determined by the information stored in each character position of said control memory element.

References Cited by the Examiner

UNITED STATES PATENTS

| | | | |
|---|---|---|---|
| 2,907,009 | 9/1959 | Lesser | 340—172.5 |
| 2,919,429 | 12/1959 | Hamilton et al. | 340—172.5 |
| 2,995,729 | 8/1961 | Steele | 340—172.5 |
| 3,095,553 | 6/1963 | Hill et al. | 340—172.5 |
| 3,117,306 | 1/1964 | Reitfort | 340—172.5 |
| 3,133,268 | 5/1964 | Avakian et al. | 340—172.5 |
| 3,153,776 | 10/1964 | Schwartz | 340—172.5 |
| 3,202,972 | 8/1965 | Stafford et al. | 340—172.5 |
| 3,229,259 | 1/1966 | Barker et al. | 340—172.5 |
| 3,241,125 | 3/1966 | Tomasulo et al. | 340—172.5 |

ROBERT C. BAILEY, *Primary Examiner.*

J. P. VANDENBURG, *Assistant Examiner.*